(12) United States Patent
Williams et al.

(10) Patent No.: US 9,811,734 B2
(45) Date of Patent: Nov. 7, 2017

(54) CROWD-SOURCED CREATION AND UPDATING OF AREA DESCRIPTION FILE FOR MOBILE DEVICE LOCALIZATION

(71) Applicant: Google Inc., Mountain View, CA (US)

(72) Inventors: Brian Patrick Williams, Mountain View, CA (US); Ryan Michael Hickman, Sunnyvale, CA (US); Laurent Tu, Penshurst (AU); Esha Nerurkar, Sunnyvale, CA (US); Simon Lynen, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/708,877

(22) Filed: May 11, 2015

(65) Prior Publication Data

US 2016/0335497 A1   Nov. 17, 2016

(51) Int. Cl.
| | |
|---|---|
| *G06K 9/00* | (2006.01) |
| *G01C 21/20* | (2006.01) |
| *G06F 17/30* | (2006.01) |
| *G06T 7/73* | (2017.01) |

(52) U.S. Cl.
CPC ....... *G06K 9/00671* (2013.01); *G01C 21/206* (2013.01); *G06F 17/30256* (2013.01); *G06T 7/74* (2017.01); *G06T 2207/10004* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 7,382,244 B1 | 6/2008 | Donovan et al. | |
| 8,521,128 B1 | 8/2013 | Welsh et al. | |
| 8,620,532 B2 | 12/2013 | Curtis et al. | |
| 8,839,121 B2 | 9/2014 | Bertolami et al. | |

(Continued)

FOREIGN PATENT DOCUMENTS

| | | |
|---|---|---|
| WO | 2011144967 | 11/2011 |
| WO | 2013049703 | 4/2013 |
| WO | 2014026338 | 2/2014 |

OTHER PUBLICATIONS

International Search Report and Written Opinion correlating to PCT/US16/030956 dated Jul. 28, 2016, 15 pages.

(Continued)

*Primary Examiner* — Hadi Akhavannik

(57) ABSTRACT

A computing system includes a network interface, a first datastore, a second datastore, and a merge module. The merge module is to receive a set of one or more area description files from a set of one or more first mobile devices. Each area description file represents a point cloud of spatial features detected by a corresponding first mobile device at an area. The computing system further includes a localization module and a query module. The localization generation module is to generate a localization area description file for the area from the set of one or more area description files and to store the localization area description file in the second datastore. The localization area description file represents a point cloud of spatial features for the area. The query module is to provide the localization area description file to a second mobile device via the network interface.

20 Claims, 11 Drawing Sheets

(56) References Cited

U.S. PATENT DOCUMENTS

| | | | |
|---|---|---|---|
| 9,251,417 B1 | 10/2014 | Xu et al. | |
| 2009/0104585 A1* | 4/2009 | Diangelo | A61C 8/0001 433/223 |
| 2010/0166294 A1* | 7/2010 | Marrion | G06K 9/6211 382/154 |
| 2011/0102460 A1 | 5/2011 | Parker | |
| 2011/0199479 A1 | 8/2011 | Waldman | |
| 2011/0221771 A1 | 9/2011 | Cramer et al. | |
| 2011/0313779 A1 | 12/2011 | Herzog et al. | |
| 2012/0197439 A1 | 8/2012 | Wang | |
| 2012/0315884 A1 | 12/2012 | Forutanpour | |
| 2013/0026224 A1 | 1/2013 | Ganick | |
| 2013/0182891 A1 | 7/2013 | Ling | |
| 2013/0222369 A1 | 8/2013 | Huston | |
| 2013/0242106 A1 | 9/2013 | Leppanen et al. | |
| 2014/0204077 A1 | 7/2014 | Kamuda et al. | |
| 2014/0254934 A1 | 9/2014 | Laxminarayana Bhat et al. | |
| 2014/0267234 A1* | 9/2014 | Hook | H04W 4/02 345/419 |
| 2014/0323148 A1 | 10/2014 | Schmalstieg | |
| 2014/0357290 A1 | 12/2014 | Gabner | |
| 2015/0332439 A1 | 11/2015 | Zhang et al. | |

OTHER PUBLICATIONS

International Search Report and Written Opinion correlating to PCT/US16/030940 dated Aug. 22, 2016, 11 pages.

Invitation to Pay Additional Fees and Results of the Partial International Search Report correlating to PCT/US16/030953 dated Aug. 25, 2016, 6 pages.

Aaron Beach et al., "Solutions to Security and Privacy Issues in Mobile Social Networking", International Conference on Computattional Science and Engineering, CSE'09, Aug. 29, 2009, 7 pages.

Marcus Goetz, "Using Crowdsourced Indoor Geodata for the Creation of a Three-Dimensional Indoor Routing Web Application", Future Internet, ISSN 1999-5903, Jun. 6, 2012, 17 pages <www.mdpi.com/journal/futureinternet>.

Vincent Lenders et al., "Location-based Trust for Mobile User-generated Content: Applications, Challenges and Implementations", HotMobile '08 Proceedings of the 9th Workshop on Mobile Computing Systems and Applications, Feb. 25, 2008, 5 pages.

Ulrich Meissen et al., "Towards a Reference Architecture of Crowdsourcing Integration in Early Warning Systems", Proceedings of the 11th International ISCRAM Conference, May 1, 2014, 5 pages.

Matthew T. Rice et al., "Crowdsourced Geospatial Data", Annual Report, BAA #AA10-4733, Contract #W9132V-11-P-0011, Nov. 1, 2012, 147 pages.

Franziska Roesner et al., "AR Systems Pose Potential Security Concerns that Should be Addressed Before the Systems Become Widespread", Communications of the ACM, Apr. 1, 2014, 9 pages.

U.S. Appl. No. 14/708,955, filed May 11, 2015, entitled "Privacy Filtering of Area Description File Prior to Upload".

U.S. Appl. No. 14/708,970, filed May 11, 2015, entitled "Privacy-Sensitive Query for Localization Area Description Filed".

International Search Report and Written Opinnion correlating to PCT/US2016/030953 dated Feb. 20, 2017, 14 pages.

Non-Final Office Action dated Apr. 6, 2017 for U.S. Appl. No. 14/708,995, 53 pages.

Requirement for Restriction/Election dated Oct. 19, 2016 for U.S. Appl. No. 14/708,955, 7 pages.

\* cited by examiner

CROWD-SOURCED CREATION AND UPDATING OF AREA DESCRIPTION FILE FOR MOBILE DEVICE LOCALIZATION

CROSS-REFERENCE TO RELATED APPLICATIONS

The present application is related to the following co-pending patent applications, the entireties of which are incorporated by reference herein:

U.S. patent application Ser. No. 14/708,955, entitled "PRIVACY FILTERING OF AREA DESCRIPTION FILE PRIOR TO UPLOAD" and filed on even date herewith; and U.S. patent application Ser. No. 14/708,970, entitled "PRIVACY-SENSITIVE QUERY FOR LOCALIZATION AREA DESCRIPTION FILE" and filed on even date herewith.

FIELD OF THE DISCLOSURE

The present disclosure relates generally to visual mapping systems and more particularly to the localization of mobile devices using visual information.

BACKGROUND

Visual mapping systems rely on spatial features (also referred to as "visual features") detected in imagery captured by a mobile device, as well as inertial information, to determine the current position and orientation of the mobile device in a three-dimensional (3D) space. Typically, the position and orientation are determined in the context of a defined coordinate frame so as to facilitate various functionality that requires synchronization to a known, fixed reference frame, such as virtual reality (VR) functionality, augmented reality (AR) functionality, or gaming or other device-enabled interactions between multiple mobile devices. Simultaneous localization and mapping (SLAM) techniques enable a mobile device to map a previously unmapped area while concurrently learning its position and orientation within the area. Thus, when the mobile device returns to the same area, it may readily determine its current position and orientation within that area through detection of previously-observed spatial features in a process known as "localization." However, when the mobile device is entering an area for the first time, the mobile device lacks these previously-detected localization cues. In conventional visual mapping systems the mobile device must "learn" the area through implementation of the visual mapping process—a process which takes considerable time and resources. To avoid the delay involved in performing the visual mapping process for a previously-unmapped area, conventional visual mapping systems instead may revert to detection of orientation or position of the mobile device based on non-visual orientation input, such as global positioning system (GPS) information or location mapping via inertial sensor feedback. However, these non-visual mapping solutions can be unreliable (e.g., poor GPS reception indoors or in areas surrounded by tall obstructions), imprecise, and prone to error due to sensor and measurement drift.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
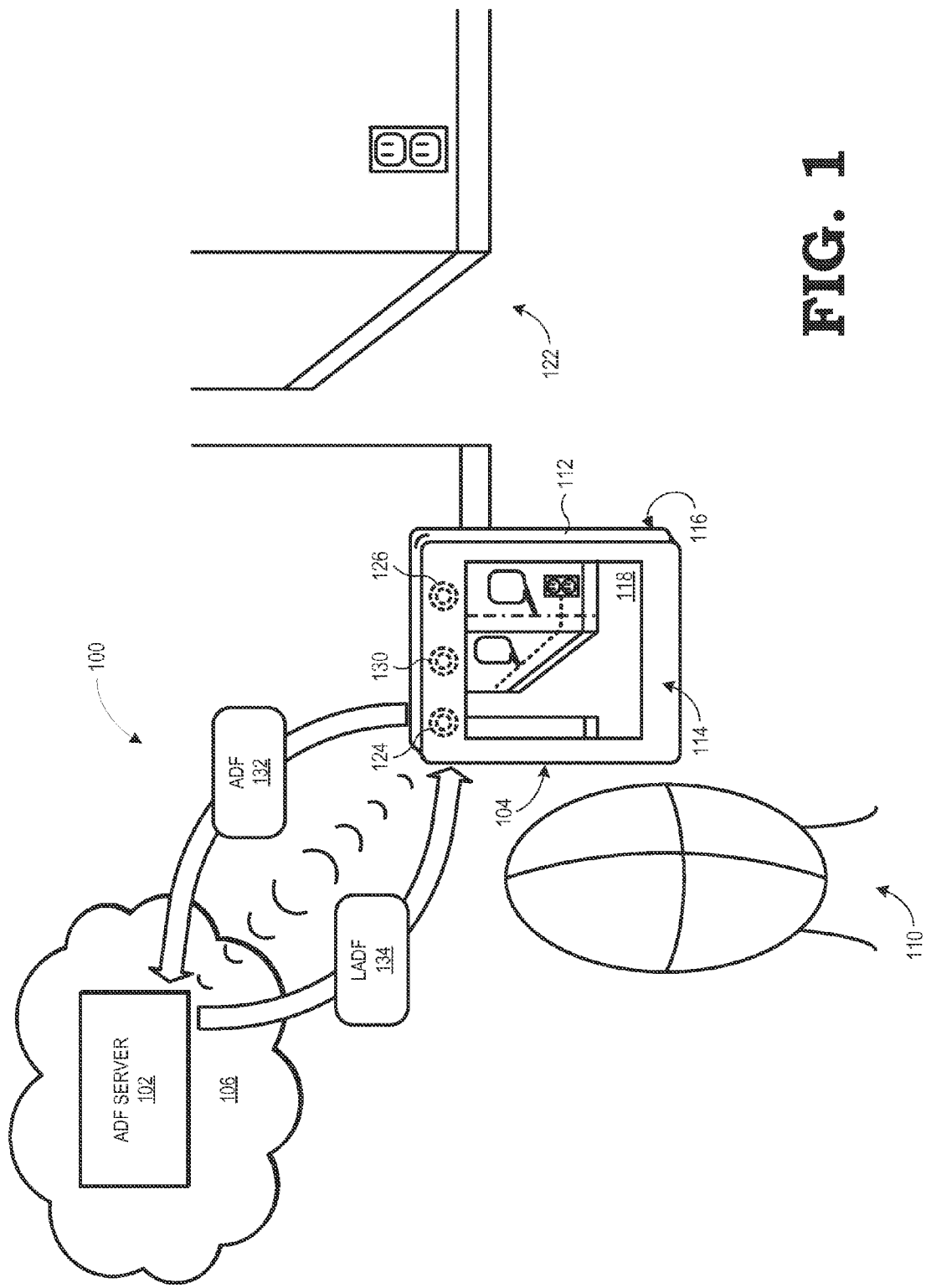
FIG. 1 is a diagram illustrating a cloud-based visual mapping system for crowd-sourced creation and updating of area description files provided to mobile devices for localization in accordance with at least one embodiment of the present disclosure.

The following description is intended to convey a thorough understanding of the present disclosure by providing a number of specific embodiments and details involving visual mapping systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-12 illustrate example systems and techniques for cloud-based creation, revision, and provision of localization area data files to mobile devices. In at least one embodiment, a visual mapping system comprises an area description file (ADF) server communicatively coupled to a plurality of mobile devices via one or more wired or wireless networks. When a mobile device enters a previously-unmapped area, the mobile device initiates an area learning process whereby the mobile device captures imagery of the area, detects spatial features using the captured imagery, and transmits representations of the spatial features, their relative geometry, associated statistical data, and concurrently captured sensor data in an ADF to the ADF server. The ADF server uses this ADF to generate a localization ADF (LADF), which represents a sparse point cloud of spatial features of the area. Note that the term "file", such as used in "area description file" or as otherwise used herein, refers to any data structure used to associate data and other information fields, or any combination of such data structures. The LADF then may be downloaded to another mobile device in the area covered by the LADF. A mobile device receiving the LADF may capture imagery of the area, detect spatial features therein, and compare the detected spatial features and their relative geometry to the spatial features and relative geometries represented by the LADF so as to localize the mobile device within the area using the reference coordinate frame presented by the LADF. In this manner, the area discovery and mapping of a previously-unmapped area may be efficiently crowd-sourced through passive collection and uploading of data by the mobile devices.

In some embodiments, the ADF server receives ADF files from multiple mobile devices for the same area, or for adjacent areas, and the ADF server operates to merge these multiple ADF files into a merged ADF file (or merged cluster of ADF files), which in turn may be used to generate one or more LADFs for the area, or sub-areas thereof. Further, as changes in the area are likely to occur, the ADF server may utilize crowd-sourced updating of an LADF generated for an area based on feedback from the mobile devices using the LADF for localization in the area. For example, in response to feedback indicating that some spatial features in the LADF are not being reliably observed by the mobile devices, the ADF server may remove these spatial features from the LADF. Conversely, in response to feedback indicating that spatial features not included in the LADF are being reliably observed by mobile devices in the area, the ADF server may add these spatial features to the LADF.

Because the point clouds and associated data represented by ADFs and LADFs provide a visual representation of an area to a certain degree, the collection of ADFs from mobile devices and the distribution of LADFs to mobile devices may have privacy implications. Accordingly, in some embodiments, the visual mapping system implements certain privacy controls. One such privacy control may include configuring the mobile device to implement one or more privacy filter processes on the data of an ADF before the ADF is uploaded to the ADF server, and thus rendering the information represented by the uploaded version of the ADF unusable for the purposes of recreating useful visual content of the area. Another such privacy control may include a two-stage LADF query for accessing LADFs for distribution to mobile devices. When a mobile device enters an area for which it does not have an LADF available, the mobile device captures imagery, detects spatial features from the captured imagery, and submits an LADF request to the ADF server, whereby the LADF request includes a set of the detected spatial features and an indicator of the location of the mobile device (e.g., GPS coordinates or one more wireless base station identifiers). The ADF server then may conduct a first query stage to identify a set of candidate LADFs that match one of the set of detected spatial features or the location indicator, and then select an LADF from the set of candidate LADFs based on the other of the detected spatial features or the location indicator. In this way, the set of spatial identifiers submitted by the mobile device may serve as proof that the mobile device is in, or has access to, the identified area, and thus there is a significantly reduced risk of a privacy breach in supplying the LADF to the requesting mobile device.

FIG. 1 illustrates a visual mapping system 100 in accordance with at least one embodiment of the present disclosure. In the depicted example, the visual mapping system 100 comprises an ADF server 102 communicatively coupled to one or more mobile devices 104. As represented by cloud 106, the ADF server 102 comprises a computing system that is remote to the mobile device 104, and is coupled to the mobile device 104 via one or more wired or wireless networks, such as via a wireless local area network (WLAN), a cellular data network, the Internet, or a combination thereof. Although described herein in the example context of a single server, in other embodiments the ADF server 102 may be implemented as a computing system comprising a cluster of servers. An example implementation of the ADF server 102 is described in greater detail below with reference to FIG. 2.

The mobile device 104 can include any of a variety of portable electronic devices operated by one or more users 110, such as head mounted display (HMD), a tablet computer, computing-enabled cellular phone (e.g., a "smartphone"), a notebook computer, a personal digital assistant (PDA), a gaming console system, a drone, and the like. In the depicted example, the mobile device 104 includes a housing 112 having a surface 114 opposite another surface 116, whereby the housing 112 typically is oriented with respect to the user 110 such that the user faces the surface 114 of the housing 112. Further, in the depicted implementation, the mobile device 104 includes a display 118 disposed at the surface 116 for presenting visual information to the user 110. Accordingly, for ease of reference, the surface 116 is referred to herein as the "forward-facing" surface and the surface 114 is referred to herein as the "user-facing" surface as a reflection of this example orientation, although the orientation of these surfaces is not limited by these relational designations.

The mobile device 104 further includes a plurality of sensors to obtain information regarding an area 122 in which the mobile device 104 is currently located. The mobile device 104 obtains visual information (imagery) for the area 122 via one or more imaging sensors, such as imaging sensors 124, 126, disposed at, for example, the forward-facing surface 116. The imaging sensors 124, 126 can be positioned and oriented on the forward-facing surface 116 such that their respective fields of view overlap starting at a specified distance from the mobile device 104, thereby enabling, via multiview analysis, depth sensing of objects in the area 122 that are positioned in the region of the overlapping fields of view. Alternatively, a depth sensor 130 disposed on the surface 116 may be used to provide depth information for the objects in the area.

The depth sensor 130, in one embodiment, uses a modulated light projector to project modulated light patterns from the forward-facing surface 116 into the area 122, and uses one or both of imaging sensors 124, 126 to capture reflections of the modulated light patterns as they reflect back from objects in the area 122. These modulated light patterns can be either spatially-modulated light patterns or temporally-modulated light patterns. The captured reflections of a modulated light flash are referred to herein as "depth images" or "depth imagery." The depth sensor 120 then may calculate the depths of the objects, that is, the distances of the objects from the mobile device 104, based on the analysis of the depth imagery. The resulting depth data obtained from the depth sensor 130 may be used to calibrate or otherwise augment depth information obtained from multiview analysis (e.g., stereoscopic analysis) of the image data captured by the imaging sensors 124, 126. Alternatively, the depth data from the depth sensor 130 may be used in place of depth information obtained from multiview analysis. A more detailed example of an electronic system of the mobile device 104 is described in greater detail below with reference to FIG. 3.

In operation, the mobile device 104 captures imagery of the area 122 via one or both of the imaging sensors 124, 126, modifies or otherwise processes the captured imagery, and provides the processed captured imagery for display on the display device 108. The processing of the captured imagery can include, for example, spatial or chromatic filtering, addition of an augmented reality (AR) overlay, conversion of real-life content of the imagery to corresponding virtual reality (VR) content, and the like. For the provision of this AR or VR functionality, the mobile device 104 relies on an accurate determination of its current six degree of freedom (6DOF) orientation and position (herein collectedly referred to as "pose") relative to a specified coordinate frame. Thus, in some embodiments, the mobile device 104 also uses imagery captured by the imaging sensors 124, 126 and non-image sensor data (e.g., inertial sensor data) to determine a relative position/orientation of the mobile device 104, that is, a position/orientation relative to the area 122, using one or more of a simultaneous location and mapping (SLAM) process, a visual odometry process, or other visual mapping process.

Conventionally, when a mobile device enters a new area (that is, an area that the particular mobile device has not previously entered), the mobile device either must complete an area learning process (e.g., a SLAM process) to learn the new area, or rely on non-visual cues (e.g., GPS coordinates) to provide some indication of the current pose of the mobile device relative to a coordinate frame. In contrast, the visual mapping system 100 leverages crowdsourcing provided through the prior explorations by other mobile devices in the area to allow a mobile device new to the area to quickly localize to a coordinate frame without extensive visual mapping of the area. To this end, mobile devices 104 connected to the ADF server 102 operate to collect and upload ADF 132 to the ADF server 102 as the mobile devices 104 move about the area 122. As described in greater detail below, the ADF 132 includes a set of spatial features detected by the mobile device 104, the relative geometry of the spatial features, various statistical metadata regarding the spatial features that describe the spatial features in ways substantially independent of the mobile device's pose, the lighting conditions, or other temporary environmental conditions or device-specific conditions, as well as sensor data collected from an inertial management unit (IMU) or other non-image sensors at the time of capture of the imagery associated with the spatial features. The ADF server 102 filters and merges the ADFs from multiple mobile devices 104 for the same area (or adjacent areas) based on the information contained in the ADF 132, and from the resulting merged ADFs generates one or more LADFs 134, each of which represents a sparse point cloud of spatial features for the area or a corresponding sub-area thereof.

Thus, when another mobile device 104 subsequently enters a new area, the mobile device 104 may query the ADF server 102 for an LADF that is associated with the area. Responsive to this query, the ADF server 102 may provide an LADF 134 to the requesting mobile device 104. The mobile device 104 may capture imagery of the area 122, detect certain spatial features contained therein, and compare the detected spatial features and their relative geometry with the spatial features and associated relative geometry represented by the LADF 134, and localize its current pose (that is, either determine its current pose or correct a previously determined pose that has drifted) based on the comparison of spatial features, such as through the application of a loop closure algorithm. The mobile device 104 further may provide feedback to the ADF server 102 based on the mobile device's usage of the LADF 134, such as feedback data indicating that a spatial feature of the LADF 134 was not observed by the mobile device 104, or feedback data indicating that a spatial feature not in the LADF 134 was observed by the mobile device 104.

The crowd-sourced and cloud-based creation, refinement, and distribution of LADFs 134 permits mobile devices 104 to quickly and efficiently localize when entering a new area, and thus avoid the need to perform a time-consuming area learning process or the need to use the less precise and often unreliable measurements from a GPS sensor or inertial sensor. Moreover, as the spatial features of the LADF 134 may be referenced to a specific coordinate frame, multiple mobile devices 104 using the LADF 134 may localize their current poses to a common coordinate frame, thereby facilitating more efficient and accurate interaction between the mobile devices 104 for functionality that relies on device pose information, such as multiplayer games, shared AR or VR functionality, and the like.

Figure 2:
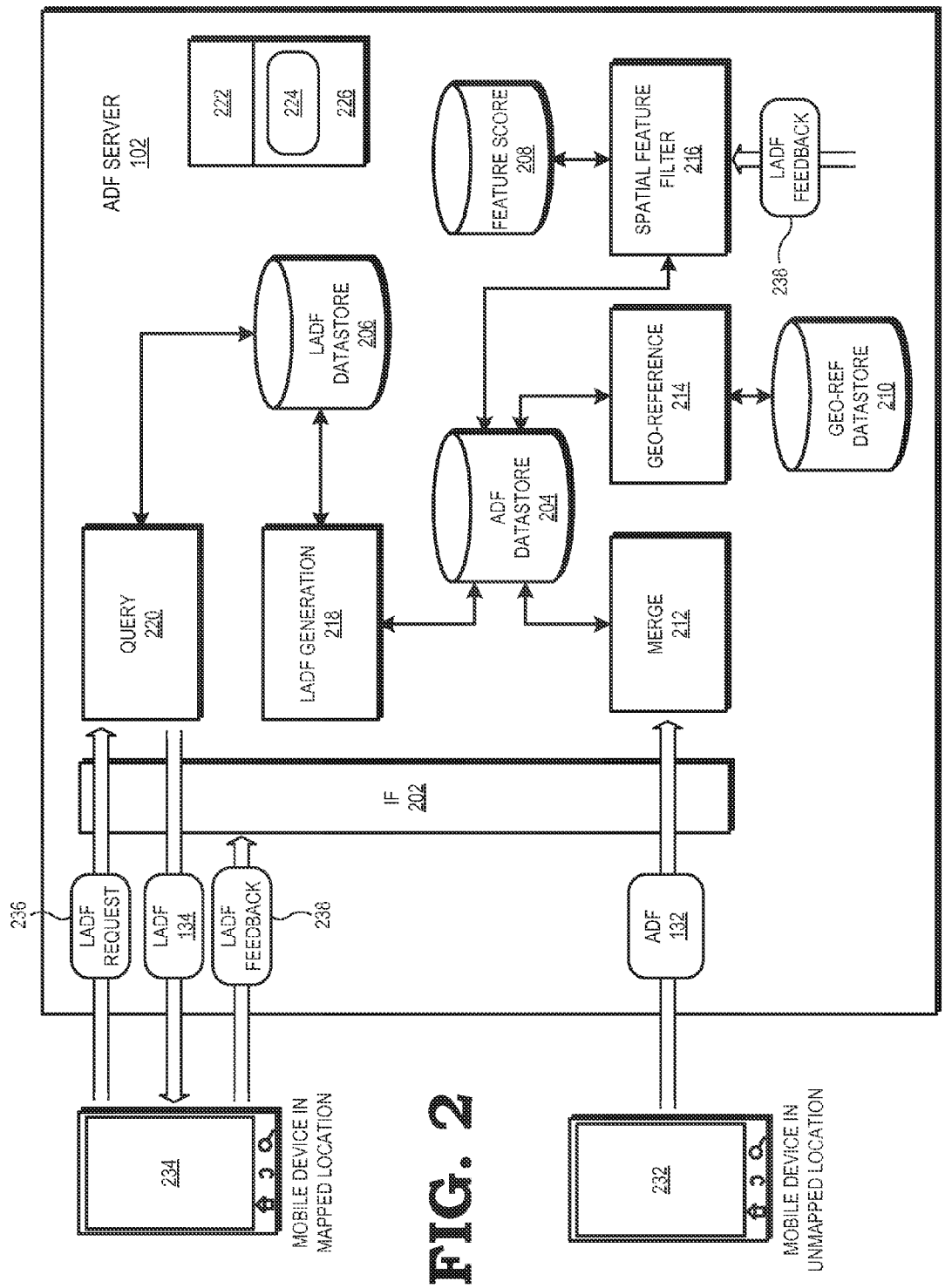
FIG. 2 is a block diagram illustrating an area description file server of the visual mapping system of FIG. 1 in accordance with at least one embodiment of the present disclosure.

FIG. 2 illustrates an example implementation of the ADF server 102 of FIG. 1 in accordance with at least one embodiment of the present disclosure. In the depicted example, the ADF server 102 comprises a computing system having a network interface 202, an ADF datastore 204, an LADF datastore 206, a feature score datastore 208, a georeference datastore 210, a merge module 212, a georeference module 214, a spatial feature filter module 216, a localization generation module 218, and a query module 220. Although illustrated as separate datastores, one or more of the datastores 204, 206, 208, 210 may be implemented together as a single datastore.

The modules 212, 214, 216, 218, 220 may be implemented as hard-coded logic (e.g., an application specific integrated circuit or programmable logic), one or more processors 222 executing software instructions 224 stored in a memory 226 or other storage device, or a combination thereof. Further, although depicted as a single server for ease of illustration, the ADF server 102 instead may be implemented as a computing system comprising a plurality of servers. For example, the functionality of the modules 212, 214, 216, and 218 may be implemented at one server, and the functionality of the query module 220 and LADF datastore 206 may be implemented at another server.

As a general overview, the merger module 212 operates to receive, via the network interface 202, ADFs 132 from one or more mobile devices 232 (one embodiment of the mobile device 104 of FIG. 1) that have entered an area for which an LADF has not yet been compiled. The merger module 212 merges the one or more ADFs 132 from the mobile devices 232 to generate merged ADF data for storage in the ADF datastore 204. The georeference module 214 may utilize georeference information from the georeference datastore 210 (which may contain, for example, imagery and associated georeference location from the Street View tool provided by Google Inc.) to provide a geographic reference to the merged ADF. The localization generation module 218 generates one or more LADFs from the resulting merged ADF data and to store and index the one or more LADFs in the LADF datastore 206 for subsequent retrieval. The query module 220 receives an LADF request 236 from a mobile device 234 (one embodiment of the mobile device 104) via the network interface 202, searches the LADF datastore 206 for the LADF 134 corresponding to the LADF request 236, and provides the LADF 134 to the mobile device 234. The mobile device 234 uses the LADF 134 for localization of the mobile device 234. During this localization process, the mobile device 234 may provide LADF feedback 238 on the LADF 134 to the ADF server 102 via the network interface 202. The ADF server 102 may use the LADF feedback 238 to adjust feature scores of spatial features represented therein in the feature score datastore 208, and based on the feature scores refine the LADF 134 by adding or removing spatial features. These operations are described in greater detail below with reference to FIGS. 4-12.

As noted, mobile devices 232 and 234 represent embodiments of the mobile device 104. Due to their respective operational requirements, a mobile device 232 performing a localization process using an LADF may not require the same capabilities as a mobile device 234 performing the ADF upload process. To illustrate, the mobile device 234 may utilize the depth sensor 120 or a stereo camera configuration to facilitate SLAM operations in association with the process of generating and uploading an ADF, whereas the mobile device 232 typically will not require a depth sensor 120 and only requires a monocular camera configuration to facilitate the localization process.

Figure 3:
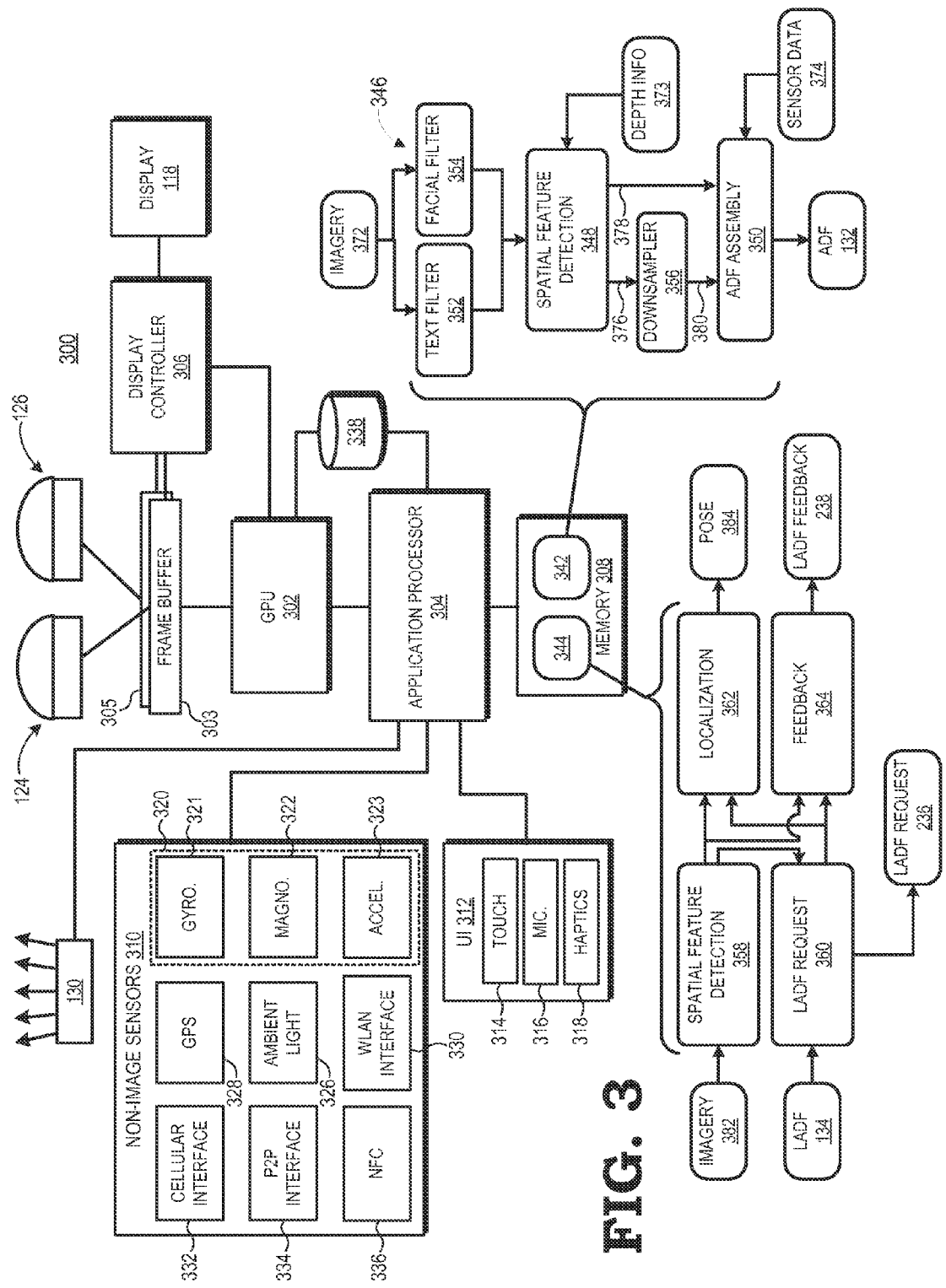
FIG. 3 is a block diagram illustrating a mobile device of the visual mapping system of FIG. 1 in accordance with at least one embodiment of the present disclosure.

FIG. 3 illustrates an example processing system 300 implemented by the mobile device 104 in accordance with at least one embodiment of the present disclosure. The processing system 300 includes the display 118, the imaging sensors 124, 126, and the depth sensor 130. The processing system 300 further includes a graphics processing unit (GPU 302), frame buffers 303 and 305, an application processor 304, a display controller 306, a system memory 308, a set 310 of non-image sensors, and a user interface 312. The user interface 312 includes one or more components manipulated by a user to provide user input to the mobile device 104, such as a touchscreen 314, a mouse, a keyboard, a microphone 316, various buttons or switches, and various haptic actuators 318. The set 310 of non-image sensors can include any of a variety of sensors used to provide non-image context or state of the mobile device 104. Examples of such sensors include an inertial management unit (IMU) 320 comprising one or more of a gyroscope 321, a magnetometer 322, and an accelerometer 323. The non-image sensors further can include, for example, an ambient light sensor 326 as well as various wireless reception or transmission based sensors, such as a GPS sensor 328, a wireless local area network (WLAN) interface 330, a cellular interface 332, a peer-to-peer (P2P) wireless interface 334, and a near field communications (NFC) interface 336. The non-image sensors also can include user input components of the user interface 312, such as the touchscreen 314 or the microphone 316.

The mobile device 104 further has access to various datastores 338 storing information or metadata used in conjunction with its image processing, location mapping, and location-utilization processes. The datastores 338 can include a spatial feature datastore to store metadata for 2D or 3D spatial features identified from imagery captured by the imaging sensors of the mobile device 104, a SLAM datastore that stores SLAM-based information, such as mapping information for sub-areas of the area 122 (FIG. 1) already explored by the mobile device 104, and an AR datastore that stores AR overlay information or VR information, such as CAD-based representations of the relative locations of objects of interest in the area 122. The datastores 338 may be implemented at one or more storage components of the mobile device 104, such as on a hard drive, solid state memory, or removable storage medium (not shown).

In operation, the imaging sensors 124, 126 capture imagery of an area and buffer the captured imagery in the frame buffers 303, 305. For imagery to be displayed in original or modified form, the GPU 302 processes the captured imagery for display (e.g., by rendering an AR overlay), and the display controller 306 controls the display 118 to display the processed imagery. Further, as described herein, the mobile device 104 operates to upload ADFs 134 for previously-unmapped locations, as well as to download LADFs for previously-mapped locations and use a downloaded LADF to facilitate localization of the mobile device 104. To this end, one or more software programs may be stored in the system memory 308 or other non-transitory computer readable medium and executed by one or both of the application processor 304 and the GPU 302 to provide this ADF generation and LADF utilization functionality. For ease of illustration, the one or more software programs are depicted in FIG. 3 as an ADF generation program 342 and an LADF processing program 344. These programs may be implemented as a thread or other process in an operating system (OS) executed by the processing system 300, as threads, processes or subroutines of the same software application, or as separately-executed software applications. Further, in some embodiments, some or all of the functionality of the programs 342, 344 described herein may be implemented via an ASIC, programmable logic, or other hard-coded logic.

The ADF generation program 342 can include, for example, a privacy filter module 346, a spatial feature detection module 348, and an ADF assembly module 350. As depicted in FIG. 3, the privacy filter module 346 may comprise one or more image content filters, such as a text filter module 352 and a facial filter module, as well as a downsampler module 356. The LADF processing program 344 can include, for example, a spatial feature detection module 358 (which may be the spatial feature detection module 348), a request module 360, a localization module 362, and a feedback module 364. The operations of the processing system 300, including the operations of the ADF generation program 342 and the LADF processing program 344, are described in detail below.

As described above, when the mobile device 104 is in an unmapped area (that is, an area for which the ADF server 102 does not have an LADF available), the mobile device 104 may operate in an ADF generation mode whereby the mobile device 104 generates an ADF representing spatial features detected in the unmapped area and upload the ADF to the ADF server 102. However, if the area has already been mapped and the ADF server 102 has an LADF for the area, the mobile device 104 instead may operate in an LADF localization mode whereby the mobile device 104 obtains the LADF for the area from the ADF server 102 and uses the sparse point cloud represented by the LADF to perform a localization process so as to localize the mobile device 104 to the area.

Figure 4:
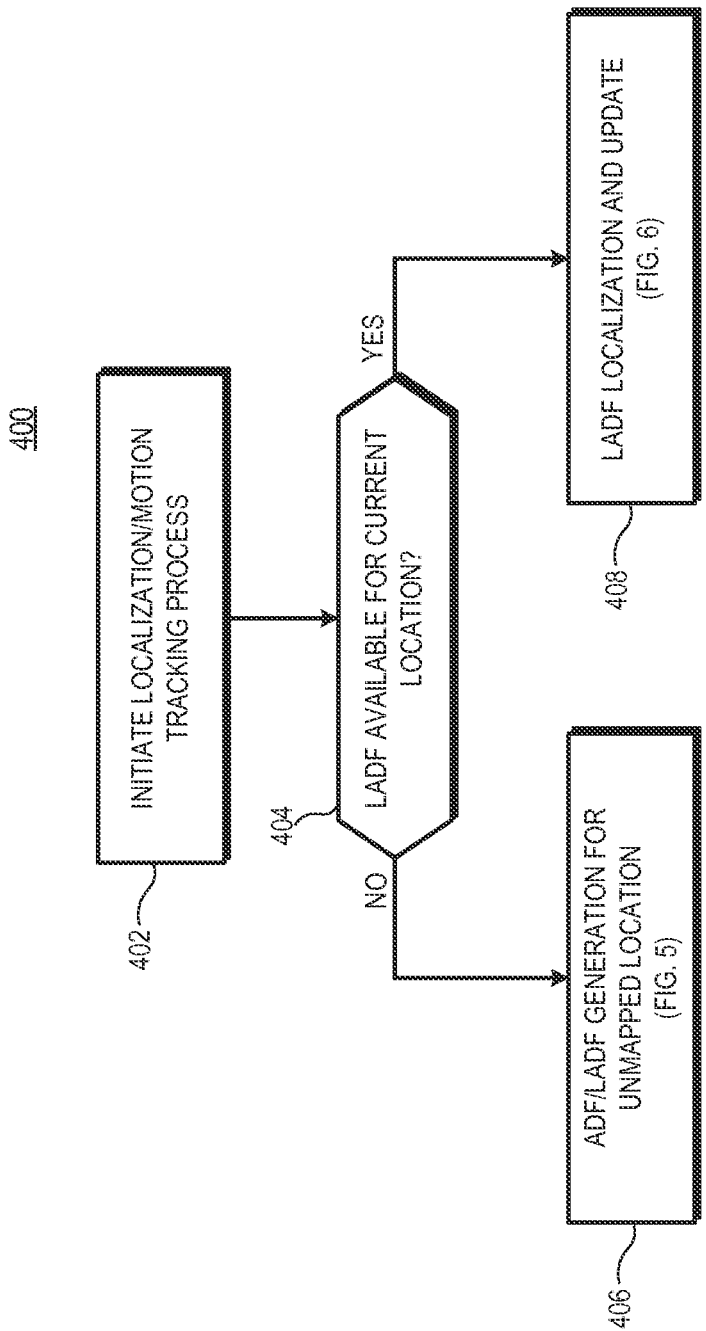
FIG. 4 is a flow diagram illustrating a method for selecting one of a previously-mapped localization process or a previously-unmapped localization process in accordance with at least one embodiment of the present disclosure.

FIG. 4 illustrates an example method 400 for selecting between these operational modes in accordance with at least one embodiment. For ease of description, the method 400 is described in the example context of the processing system 300 of FIG. 3. The method 400 initiates at block 402, whereby the mobile device 104 determines that it has moved into an area that has not been previously mapped by the mobile device 104. In response, the mobile device 104 initiates a localization process or motion tracking process.

At block 404, the mobile device 104 queries the ADF server 102 to determine whether an LADF is available for the area. As described below with reference to FIGS. 10-12, the ADF server 102 may implement a two-stage query process whereby the mobile device 104 provides both a set of spatial features from imagery captured by the mobile device in the area and one or more location indicators (e.g., GPS coordinates or base station identifiers of WLAN or cell tower base stations detected by the mobile device 104) and the ADF server 102 queries the LADF datastore 206 to identify the corresponding LADF.

In the event that an LADF is not available from the ADF server 102, the area is considered to be an unmapped location and thus at block 406 the mobile device 104 and the ADF server 102 coordinate to perform an ADF/LADF generation process for the unmapped location. This process is described in greater detail below with reference to FIG. 5. In the event that an LADF is available from the ADF server 102, the area is considered to be a mapped location and thus at block 408 the mobile device 104 and the ADF server 102 coordinate to perform an LADF localization and update process, which is described in greater detail below with reference to FIG. 6.

Figure 5:
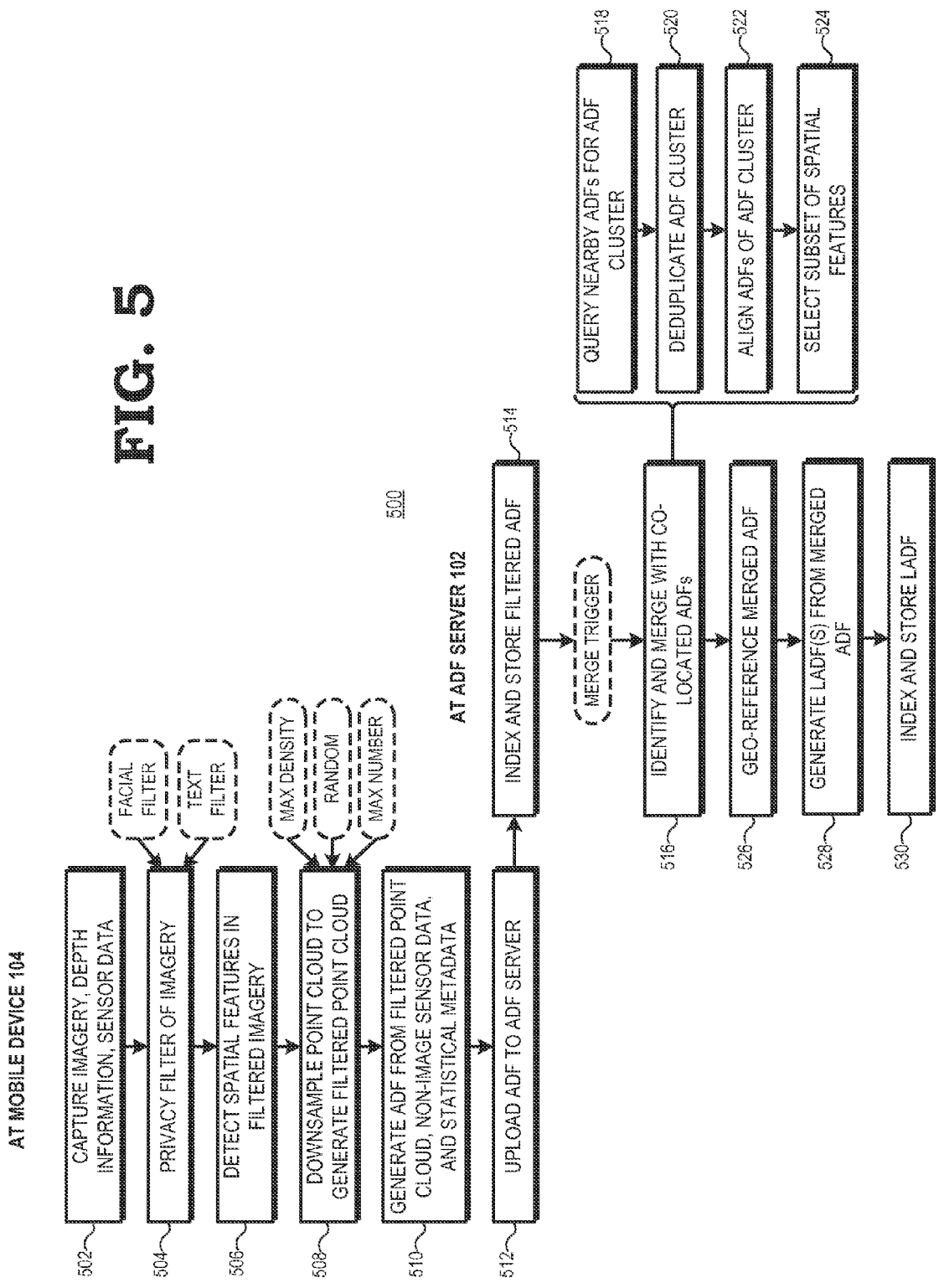
FIG. 5 is a flow diagram illustrating a method for crowd-sourced generation of a localization area description file in accordance with at least one embodiment of the present disclosure.

FIG. 5 illustrates an example method 500 for implementing the ADF/LADF generation process in accordance with at least one embodiment. As noted above, the ADF/LADF generation process is performed responsive to the determination that an LADF is not available for an area newly encountered by the mobile device 104. Accordingly, after receiving user consent for the passive collection of area description data, the method 500 initiates at block 502 with the initiation of an area learning process using the sensors of the mobile device 104. To perform the area learning process, the mobile device 104 captures imagery 372 (FIG. 3) via imaging sensors 124, 126 and captures corresponding depth information 373 via the depth sensor 130 as the mobile device 104 moves through the area. The mobile device 104 may employ, for example, an interactive game to induce the user of the mobile device 104 to explore the area as the imagery 372 and depth information 373 is captured by the mobile device 104.

Concurrently, the ADF assembly module 350 captures non-image sensor data 374 (FIG. 3) from one or more of the non-image sensors of the set 310. To illustrate, the ADF assembly module 350 may capture sensor data from the accelerometer 323 during the capture of the imagery 372, and thus represent the orientation of the mobile device 104 with respect to gravity at the time of the imagery capture. Similarly, sensor data captured from the gyroscope 321 may be used to determine the direction of travel of the mobile device 104 with respect to the visual features represented in the captured imagery. Further, the non-image sensor data 374 may include sensor data that may operate as location indicators of the mobile device 104. These location indicators may be georeferenced location indicators, such as latitude/longitude coordinates represented in the sensor data provided by the GPS sensor 328. Alternatively, these location indicators may be inferred location indicators. To illustrate, as WLAN base stations and cell tower base stations are presumed to be fixed, the detection of a WLAN base station or a cell tower base station serves as an indication that the mobile device is in proximity to the detected base station, and thus the base station identifier (BSID), media access control (MAC) address, or other identifier of the base station can serve as an inferred location indicator for the mobile device.

As described below, the captured imagery 372 and depth information 373 is used to determine a point cloud of spatial features which ultimately is uploaded to the ADF server 102. While this point cloud is not image data itself, depending on the density of the point cloud and other conditions, it is possible that an unmodified point cloud could be used to reconstruct certain visual content originally present in the captured imagery 372. For example, if the mobile device 104 were placed particularly close to a document, it is possible that the point cloud determined from the imagery captured of the document could be used to reproduce the text of the document. Accordingly, to prevent disclosure of unintended visual content, the privacy filter module 346 may implement at least two privacy controls.

The first privacy control is implemented at block 504, wherein the privacy filter module 346 performs one or more content filter processes on the captured imagery 372 to remove image content from regions that may have privacy implications. For example, at block 504 the text filter module 352 may perform a text filter process whereby each image captured at block 502 is scanned using one or more well-known text recognition algorithms to determine whether there are any regions in the image that potentially represent text content. For each region detected as a potential text region, the text filter module 352 may obfuscate or delete this region by, for example, performing a blending operation with pixels in the region or in adjacent regions, by replacing the pixel values in the region with the same default pixel region or otherwise delete the pixel values in the region, and the like. Likewise, at block 504 the facial filter module 354 may implement a facial filter process whereby each captured image is scanned using one or more well-known facial recognition algorithms to determine whether there are any regions in the image that potentially represent a human face, and filter the image to remove the image content from each region so identified. In this manner, the imagery is pre-filtered to remove potentially sensitive visual content prior to spatial feature detection, and thus the resulting point cloud of spatial features cannot be used to reconstruct the potentially sensitive visual content.

At block 506, the spatial feature detection module 348 analyzes the filtered imagery to detect spatial features contained therein. Any of a variety of spatial feature extraction algorithms may be used, such as, for example, a Scale-Invariant Feature Transform (SIFT) algorithm, a Speeded-Up Robust Features (SURF) algorithm, a Gray Level Patch algorithm, a Gradient Location and Orientation Histogram (GLOH) algorithm, a Zernike Moment algorithm, a Binary Robust Independent Elementary Features (BREIF) algorithm, Oriented BRISK (ORB) algorithm, Binary Robust Invariant Scalable Keypoints (BRISK) algorithm, Difference of Gaussians (DOG) algorithm, Fast Retina Keypoint (FREAK) algorithm, and the like. The spatial feature detection module 348 provides these detected spatial features as spatial feature data 376. To illustrate, the FREAK algorithm provides for the comparison of pairs of pixels within an image patch, with the output of each comparison being a "0" or a "1" based on which pixel is lighter or darker of the pair. In the FREAK algorithm, 512 such comparisons are computed over the image patch, and the result is a spatial feature descriptor that is a binary string of length 512 for a corresponding spatial feature representing the image patch, as well as an (x,y,z) vector identifying the position of the spatial feature in the 3D reference frame.

Further, the spatial feature detection module 348 determines statistical metadata 378 for each detected point. The statistical metadata 378 describes the corresponding spatial feature in a manner that is substantially independent of the particular viewing angle of the mobile device 104 or of the ambient lighting when the corresponding imagery was captured. For example, the statistical metadata 378 may comprise values representing the mean and standard deviation of the brightness of pixels representing the spatial feature, brightness gradients (or other visual characteristic gradients) in one or more directions, and the like.

Although the privacy filter module 346 scrubbed the imagery of detected text and facial content, and thus the original point cloud of spatial features represented by the spatial feature data 376 is substantially devoid of textual and facial content, the original point cloud may still have sufficient spatial feature density to permit some level of reconstruction of visual appearance of the area from the original point cloud. Thus, as a second privacy control, at block 508 the downsampler module 356 of the privacy filter module 346 downsamples the original point cloud so as to generate a filtered point cloud 380 (FIG. 3) of spatial features that contains only a selected subset of the spatial features of the original point cloud. This has the benefit of both reducing the likelihood that the visual appearance of an area may be reconstructed from the resulting point cloud, as well as reducing the amount of data needed to represent the resulting filtered point cloud 380. The downsampling process may be controlled by one or more downsampling criteria. For example, in some embodiments, the downsampling process may include the random selection of spatial features for exclusion from the filtered point cloud, the removal of every Xth spatial feature (X being an integer greater than 2), or the selection of no more than a maximum number of spatial features for inclusion in the filtered point cloud. As another example, the downsampling process may be controlled by a maximum spatial feature density criterion that specifies a maximum number of spatial features per cubic unit (that is, unit volume). For example, the maximum spatial feature density criterion may specify that the filtered point cloud 380 contain at most one spatial feature per cubic foot, and thus downsample the original point cloud so that no more than one spatial feature per cubic foot is represented in the resulting filtered point cloud.

At block 510, the ADF assembly module 350 uses the filtered point cloud 380, statistical metadata 378, and the non-image sensor data 374 to generate an ADF 132. In one embodiment, the ADF 132 comprises a file or other data structure that represents the filtered point cloud 380 as a list or other set of multidimensional coordinates, along with a field for each multidimensional coordinate to store the statistical metadata 378 for the represented spatial feature. To illustrate, each multidimensional coordinate may comprise an (x,y,z) floating point vector that represents a 3D position of a corresponding spatial feature in the (X,Y,Z) coordinate frame of the mobile device 104. The data structure further may include one or more fields to store the non-image sensor data 374, as well as a field to store a unique identifier (UID) assigned to the ADF 132 by the ADF server 102, as described below.

At block 512, the ADF assembly module 350 provides the ADF 132 to the appropriate network interface (e.g., the cellular interface 332 or the WLAN interface 330) for transmission to the ADF server 102. In some embodiments, the ADF assembly module 350 signals a request to upload an ADF to the ADF server 102, and the ADF server 102 responds with a UID assigned to the ADF, which the ADF assembly module 350 inserts into the appropriate field in the ADF 132 before it is uploaded. Further, while the process of blocks 502-512 has been described as a sequential process whereby the ADF 132 is completed before it is uploaded, in some embodiments, the ADF 132 is generated and uploaded in an iterative process whereby the ADF 132 is generated as a sequence of ADF blocks, each ADF block containing a subset of the point cloud generated from a portion of the captured imagery, and each ADF block being marked with the UID assigned to the ADF and uploaded to the ADF server 102 as it is generated. The ADF server 102 thus may store these ADF blocks individually, or may combine the ADF blocks denoted by the same UID into a single ADF 132.

The ADF 132 uploaded by the mobile device 104 represents certain visual features present in the area in which the mobile device 104 is located. However, through the privacy controls implemented by the mobile device 104 as described above with reference to blocks 504 and 508, the information contained in the ADF 132 that is provided to the ADF server 102 is substantially devoid of any content that may have privacy implications. Rather, while the resulting ADF 132 contains a sparse point cloud that may describe various edges, corners, and other visual features of the area so to a degree sufficient to allow another mobile device to subsequently localize based on these described visual features, the sparse point cloud contains insufficient information to support replication of visual appearances of the area in a way meaningful to human perception. As such, the ADF server 102 should not come into possession of any information from the mobile device 104 that has a measurable potential to reveal potentially sensitive information regarding a mapped area.

The role of the ADF server 102 in the ADF/LADF generation process initiates at block 514 with the receipt of the ADF 132 by the merge module 212 via the network interface 202 from the mobile device 104. Upon receipt of the ADF 132, the merge module 212 temporarily indexes and stores the ADF 132 in the ADF datastore 204. The ADF 132 may be indexed for temporary storage based on the UID assigned to the ADF 132, based on the spatial features represented in the point cloud represented by the ADF 132, based on the location indicator(s) included with the ADF 132, and the like. In at least one embodiment, each ADF 132 is stored and indexed in the ADF datastore 204 using the two-layer query approach described below with reference to FIGS. 10-12.

In some instances, multiple mobile devices may have uploaded a corresponding ADF for an area or for adjacent areas. The ADF server 102 thus operates at block 516 to merge these co-located ADFs before processing the resulting merged ADFs into one or more LADFs. The merge process of block 516 may be initiated in response to any of a variety of triggers. For example, the merge process may be triggered by the lapse of a specified amount of time, by the receipt of a specified number of ADFs from mobile devices, by the request for an LADF from a mobile device, and the like. In response to such a trigger, at block 518 the merge module 212 signals the query module 220 to query the ADF datastore 204 to identify whether there are any "nearby" ADFs—that is, ADFs that cover the same area or an adjacent area. In some embodiments, nearby ADFs may be identified based on comparisons of the location indicators associated with ADFs in the ADF datastore 240. For example, assuming the upload of an ADF 132 from the mobile device 104 triggered the merge process and the uploaded ADF 132 includes one or more WLAN MAC addresses as location indicators, then those ADFs in the ADF datastore 240 identified by the query module 220 as having the same WLAN MAC address as supplied with the uploaded ADF, or with WLAN MAC addresses of WLAN base stations known to be adjacent to the area covered by a WLAN base station identified by the uploaded ADF, are identified as nearby ADFs. As another example, the uploaded ADF may be provided with GPS coordinates as a location indicator, and the query module 220 may identify ADFs in the ADF datastore 240 as being nearby based on their corresponding GPS coordinates. In other embodiments, nearby ADFs may be identified based on a comparison of the spatial features represented in the uploaded ADF with the spatial features represented in ADFs stored in the ADF datastore 240. Those ADFs having a sufficiently overlapping set of spatial features thus may be identified as representing the same area or a nearby area, and thus identified as nearby ADFs. Still further, as described below with reference to FIGS. 10-12, the ADF server 102 may implement a two-layer query for one or both of the ADF datastore 204 and the LADF datastore 206 such that the each stored ADF/LADF is indexed for storage based on both its spatial feature set and one or more location indicators, and nearby ADFs are identified by performing a two-layer indexing process using both the spatial feature set of the uploaded ADF as well as one or more location indicators of the uploaded ADF.

The set of one or more nearby, or co-located, ADFs identified by the query module 220 are referred to herein as an "ADF cluster." With an ADF cluster identified, at block 520 the merge module 212 operates to perform one or more deduplication processes to remove duplicate spatial features represented in the ADFs of the ADF cluster. Further, in the event that the ADF cluster represents an excessively large area, or contains an excessively large number of spatial features, the merge module 212 may split the ADF cluster into one or more smaller ADF clusters, each of which may be processed as described herein. At block 522, the merge module 212 employs one or more well-known loop closure algorithms to determine the relative alignment between the ADFs of the ADF cluster. At block 524, the merge module 212 analyzes the ADF cluster to selectively remove spatial features which are not reliably observed in most or all of the ADFs of the ADF cluster, as identified using one or more stability criteria. This serves both the purpose of eliminating spatial features which are likely not representative of permanent visual features of the area (and thus unreliable sources for localization), as well as reducing the total number of spatial features in the combined point cloud represented by the ADF cluster. In selecting the spatial features to remove, the merge module 212 may employ a scoring system based on a stability criterion, such as by giving spatial features scores based on the frequency that they are observed within the ADFs of the ADF cluster. Further, as newer ADFs are more likely to represent the current state of the area, the merge module 212 may give inclusion preference to spatial features in newer ADFs.

In some instances, the non-image sensor data 374 supplied with an ADF may permit the ADF to be georeferenced. For example, the non-image sensor data 374 may include GPS coordinates and an indicator of the georeferenced pose of the mobile device 104 at the time of the detection of the spatial features in the ADF. With the relative alignment of the ADFs of the ADF cluster determined at block 522, if one ADF in the ADF cluster is georeferenced, then at block 526 the other ADFs in the ADF cluster may be georeferenced based on application of a coordinate frame translation using the relative alignment and geolocation information of the georeferenced ADF. Further, in the event that georeferenced visual reference data is available, such as via the Street View tool provided by Google Inc., the ADFs of the ADF cluster may be georeferenced using this georeferenced visual reference data.

With the ADFs of the ADF cluster merged, at block 528 the localization generation module 218 uses the merged ADFs to generate one or more LADFs for the areas represented by the merged ADFs. In the event that the data size of the merged ADFs are sufficiently small, or cover a sufficiently small area, the merged ADFs may be stored and indexed as a single LADF. However, in the event that the data size of the merged ADFs is over a threshold, the merged ADFs cover too large of an area, or the area contains multiple separate sub-areas (as identified via walls, partitions, doors, and windows in the point clouds of the ADFs), the localization generation module 218 may spatially partition the merged ADFs to generate multiple LADFs, each LADF covering a different sub-area. In such instances, the localization generation module 218 may attempt to identify logical partition lines, such as by identifying multiple rooms within the area based on the detection of walls or other room dividers within the point cloud represented by the merged ADFs, and create a separate LADF for each identified room, which has the additional benefit from a privacy perspective of limiting the scope of the LADF to a single room.

For each LADF generated, at block 530 the localization generation module 218 provides the LADF to the LADF datastore 206 for indexing and storage. As noted above and as described in detail below, in some embodiments the LADF datastore 206 employs a two-layer index for each LADF, whereby each LADF is indexed both by one or more location indicia and by the spatial features represented by the LADF. Accordingly, when storing an LADF in the LADF datastore 206, the LADF datastore 206 stores the LADF in a datastore entry indexed by one of its location indicator(s) or its spatial feature set (and relative geometries therein), and the other of the location indicator(s) or the spatial feature set is used to select between multiple LADFs similarly indexed.

With the conclusion of the process at block 530 of method 500, the ADF server 102 has generated one or more LADFs for a previously unmapped area using one or more ADFs uploaded from one or more mobile devices 104 that have had the opportunity to explore the area. Thus, the ADF server 102 is ready to supply a LADF to any other mobile device that encounters this area for the first time, as described by FIG. 6 below.

Figure 6:
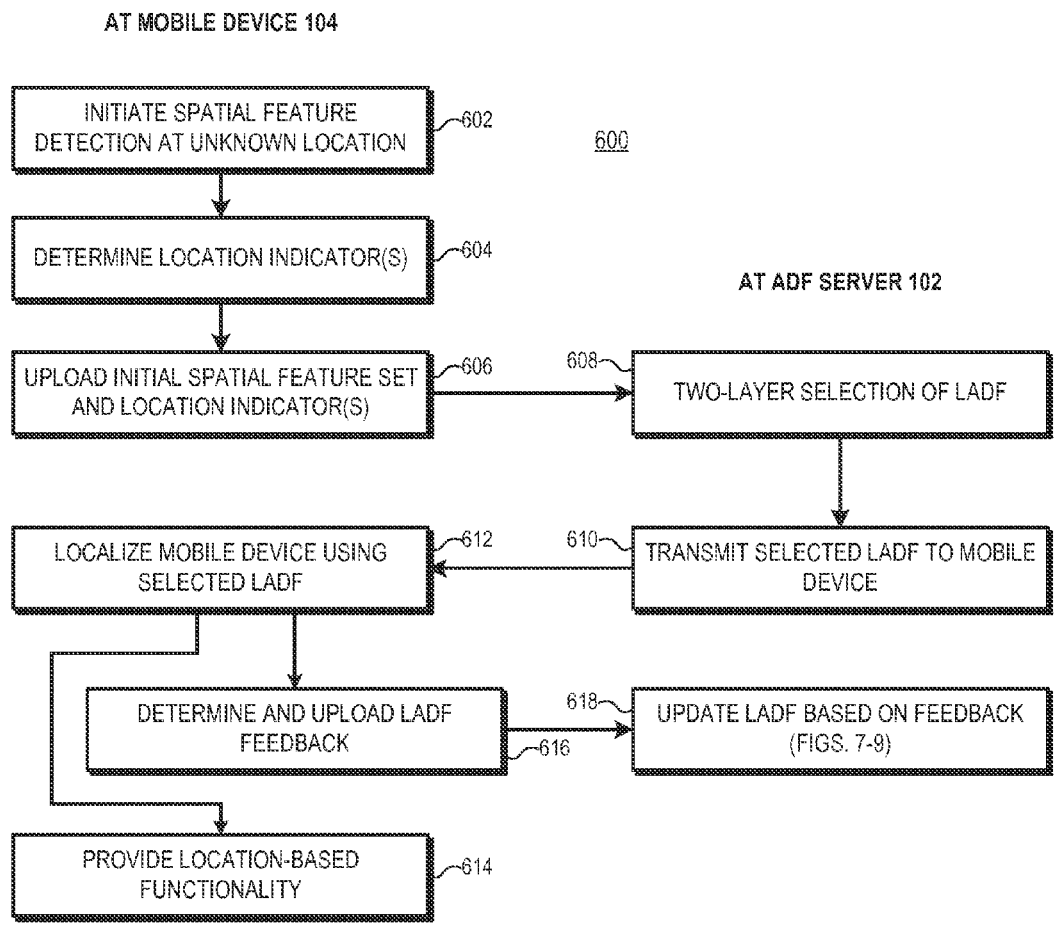
FIG. 6 is a flow diagram illustrating a method for localization of a mobile device using a localization area description file obtained from a remote area description file server in accordance with at least one embodiment of the present disclosure.

FIG. 6 illustrates an example method 600 for performing the LADF localization and update process represented by block 408 of FIG. 4 in accordance with at least one embodiment. The method 600 initiates at block 602 when the mobile device 104 enters an area that the mobile device 104 has not previously encountered and mapped. In response to this determination, the mobile device initiates a spatial feature detection process for the area. To this end, the mobile device 104 triggers the imaging sensors 124, 126 to begin the capture of imagery 382 (FIG. 3) of the area and triggers the depth sensor 130 to begin the capture of depth information for the area, and from the imagery 382 and depth information the spatial feature detection module 358 detects an initial set of spatial features representative of the area. At block 604, the request module 360 determines one or more location indicators for the location of the mobile device 104 at the time of spatial feature detection in the area. As noted above, these location indicators may be specific geographic location indicators, such as GPS coordinates obtained from the GPS sensor 328, inferential location indicators, such as WLAN MAC addresses, WLAN BSIDs, or cell tower BSIDs, or a combination thereof. At block 606, the request module 360 uses the initial spatial feature set and the one or more location indicators to generate an LADF request 236 and transmit the LADF request 236 to initiate an inquiry into the availability of an LADF for the area.

In response to receipt of the LADF request 236 at the query module 220 of the ADF server 102 via the network interface 202, at block 608 the query module 220 queries the LADF datastore 206 to identify a suitable LADF for the area for use by the mobile device 104. In at least one embodiment, the query module 220 and the LADF datastore 206 employ a two-layer indexing scheme to identify a suitable LADF based on both the initial spatial feature set and the location indicators, as described in detail below with reference to FIGS. 10-12. Assuming a suitable LADF is identified, at block 610 the query module 220 transmits the selected LADF (as LADF 134) to the requesting mobile device 104.

In response to receiving the LADF 134 in response to the LADF request 236, the request module 360 provides the LADF 134 to both the localization module 362 and the feedback module 364. At block 612, the localization module 362 employs one or more well-known loop closure algorithms to localize the mobile device 104 to the coordinate frame represented in the LADF 134 based on comparisons of spatial features from the area detected by the spatial feature detection module 358 to the sparse point cloud of spatial features represented in the LADF 134, the result of which is a determine pose 384 (FIG. 3) of the mobile device 104 in the identified coordinate frame. Further, in the event that the LADF was able to be georeferenced, the determined pose 384 likewise may be georeferenced through the appropriate translation. With the mobile device 104 localized and the pose 384 determined, at block 614 one or more components of the mobile device 104 may provide various functionality that relies on accurate pose information, such as the implementation of AR or VR content, multiple-player games, navigation tools, and the like.

The generation of the LADF 134 relies on the detection and selection of spatial features observed in the area by one or more mobile devices 104. However, as the area may have transient objects included in the observed spatial features, or as the configuration of the area may change over time, an LADF 134 may become less useful, or "stale." Accordingly, in some embodiments, with user permission, the mobile devices 104 may provide feedback on the LADF, which may be used by the ADF server 102 to refine, or "refresh" the LADF for subsequent use by other mobile devices. To this end, at block 616 the feedback module 364 may compare spatial features identified by the spatial feature detection module 358 in the area with the spatial features of the sparse point cloud represented by the LADF 134 and generate LADF feedback 238 representing one or more of: spatial features of the LADF 134 that were also observed by the spatial feature detection module 358; spatial features of the LADF 134 that were not observed by the spatial feature detection module 358; and spatial features observed by the spatial feature detection module 358 that were not present in the LADF 134. The LADF feedback 238 is uploaded to the ADF server 102. At block 618, the spatial feature filter module 216 receives the LADF feedback 238, updates the feature scores of spatial features in the feature score datastore 208 accordingly, and then may update the LADF to include new spatial features or to remove previously-included spatial features based on the updated feature scores.

Figure 7:
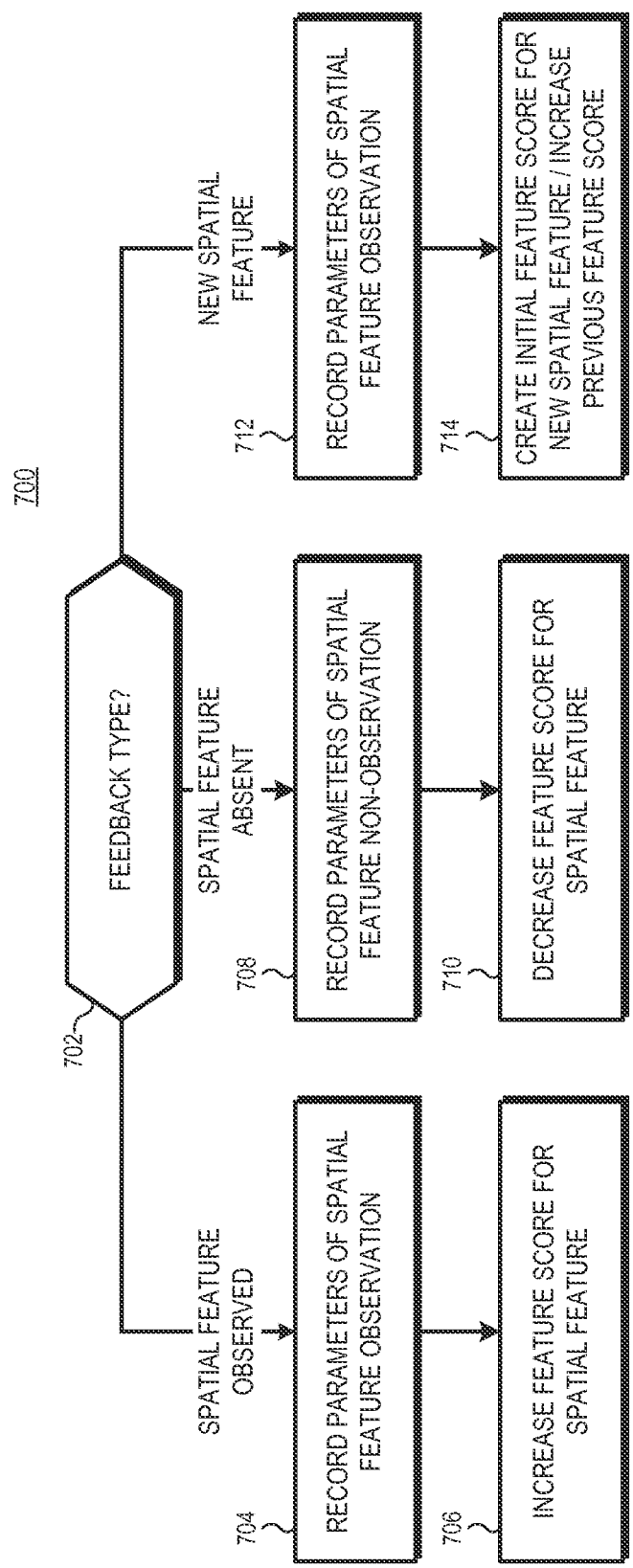
FIG. 7 is a flow diagram illustrating a method for crowd-sourced updating of a localization area description file in accordance with at least one embodiment of the present disclosure.
Figure 8:
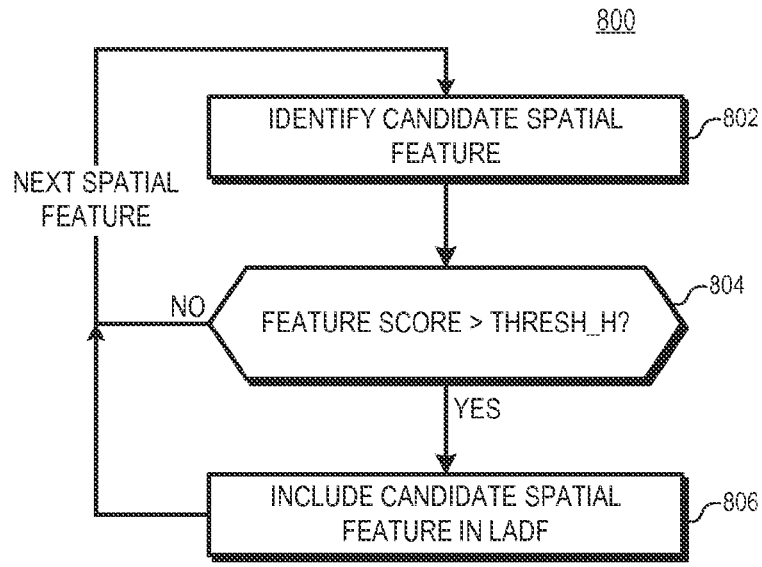
FIG. 8 is a flow diagram illustrating a method for evaluating a candidate spatial feature for inclusion in a localization area description file in accordance with at least one embodiment of the present disclosure.
Figure 9:
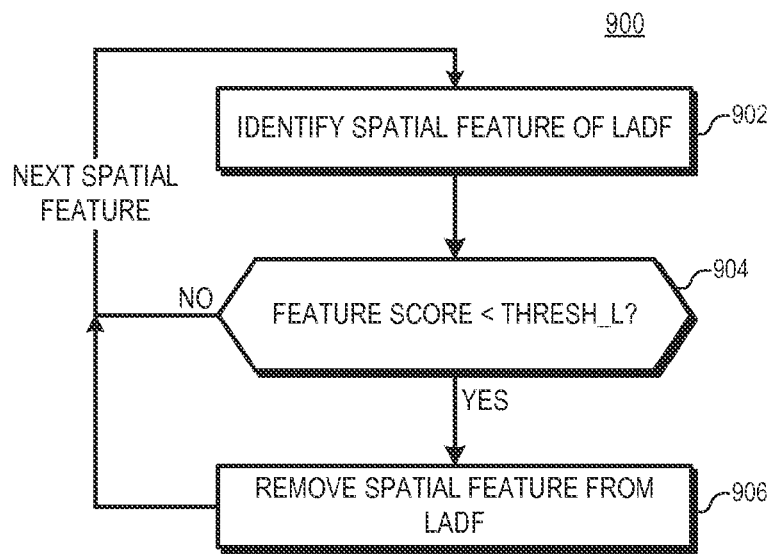
FIG. 9 is a flow diagram illustrating a method for evaluating a spatial feature for removal from a localization area description file in accordance with at least one embodiment of the present disclosure.

FIGS. 7-9 together illustrate an example of the process of refining an LADF 134 based on LADF feedback 238 in accordance with at least one embodiment. Initially, all spatial features represented in an LADF 134 are provided an initial feature score, which may be the same for all spatial features in the LADF 134, or which may be based on one or more properties of the spatial feature. For example, a spatial feature may be assigned an initial feature score based on the number of times it appeared in the ADFs of the ADF cluster from which the LADF 134 was generated. For the following description, it is assumed that a higher feature score reflects a more reliable spatial feature, and conversely a lower feature score indicates a less reliable spatial feature. The LADF feedback 238 supplied by a mobile device 104 can include one or more entries, with each entry either confirming the observation of a spatial feature present in the LADF 134 by the mobile device 104, denying the observation of a spatial feature present in the LADF 134 by the mobile device, or suggesting a new spatial feature observed by the mobile device 104 and not present in the LADF 134. The feature scores of spatial features thus may be adjusted based on the entries and the feedback type they represent.

The method 700 of FIG. 7 represents the processing implemented by the ADF server 102 for each entry of the LADF feedback 238. At block 702, the spatial feature filter module 216 accesses a selected entry of the LADF feedback 238 to determine the type of feedback represented by the entry. In the event that the feedback entry confirms that the mobile device 104 observed a corresponding spatial feature of the LADF 134, at block 704 the spatial feature filter module 216 extracts one or more parameters pertaining to the identification of the spatial feature as represented in the feedback entry, such as a time stamp indicating a time of observation of the spatial feature by the mobile device 104, and records the extracted parameters in the feature score datastore 208. Further, at block 706, the spatial feature filter module 216 increases the feature score for the corresponding spatial feature to reflect its recent observation.

Returning to block 702, in the event that the feedback entry indicates that the mobile device 104 did not observe a spatial feature represented in the LADF 134, at block 708 the spatial feature filter module 216 extracts one or more parameters pertaining to the identification of the spatial feature as represented in the feedback entry, such as a time stamp indicating a time when the mobile device 104 was capturing imagery of the region in which the spatial feature should have been observed but was not, and records the extracted parameters in the feature score datastore 208. Further, at block 710, the spatial feature filter module 216 decreases the feature score for the corresponding spatial feature to reflect its missed observation.

Returning again to block 702, in the event that the feedback entry indicates that the mobile device 104 reliably observed a spatial feature not represented in the LADF 134, at block 712 the spatial feature filter module 216 extracts one or more parameters pertaining to the identification of the previously-unobserved spatial feature as represented in the feedback entry, such as a time stamp indicating a time when the mobile device 104 first or last observed the spatial feature, a frequency of observation of the spatial feature (e.g., the percentage of times the spatial feature was observed when the mobile device 104 was oriented in the direction of the region containing the spatial feature), and the like, and records the extracted parameters in the feature score datastore 208. Further, at block 714, the spatial feature filter module 216 either creates a feature score for the corresponding spatial feature in the feature score datastore 208 and assigns an initial value to the feature score if the spatial feature is not already represented in the feature score datastore 208. Otherwise, if a feature score is already present for the newly-observed spatial feature (that is, the spatial feature was also observed by another mobile device 104 previously), the spatial feature filter module 216 increases the feature score for the spatial feature. Method 700 then returns to block 702 to repeat the process for the next entry in the LADF feedback 238.

FIG. 8 illustrates an example method 800 for evaluating a candidate spatial feature for inclusion in an LADF 134 in accordance with at least one embodiment. As described above, mobile devices 104 may provide LADF feedback 238 that identifies newly observed spatial features in an area that may be candidates for inclusion in the LADF 134 for the area, and the spatial feature filter module 216 may create a feature score the first time a spatial feature is detected, and increase the feature score each time the same spatial feature is observed by another mobile device 104. Thus, the feature score for each of these spatial features serves as an indicator of the viability of the candidacy of the spatial feature for inclusion in the LADF 134 (that is, how "reliable" the spatial feature is for purposes of localization). Accordingly, in response to a trigger condition, such as the aging of an LADF 134 exceeding a certain threshold, or in response to sufficient feedback from mobile devices 104 indicating that a revision to the LADF 134 would be warranted, at block 802 the spatial feature filter module 216 selects one of the candidate spatial features under consideration for inclusion in the LADF 134 from the feature score datastore 208 and at block 804 the spatial feature filter module 216 compares the feature score of the selected candidate spatial feature with a specified threshold, designated "THRESH_H". This threshold may be a fixed threshold, or may be based on one or more current conditions. For example, in one embodiment, the threshold THRESH_H may be set to the median current feature score for the spatial features currently included in the LADF 134.

In the event that the feature score of the candidate spatial feature does not exceed the threshold THRESH_H, the spatial feature filter module 216 ceases any further consideration of the candidate spatial feature (in the current round of evaluation), and the method 800 returns to block 802 for the selection of the next candidate spatial feature. Otherwise, if the feature score exceeds the threshold THRESH_H, at block 806 the spatial feature filter module 216 signals the localization generation module 218 to incorporate the selected candidate spatial feature into the LADF 134. In some embodiments, the incorporation of a new spatial feature into the LADF 134 may require the elimination of another spatial feature from the LADF 134. In such cases, the spatial feature filter module 216 may select, for example, the spatial feature having the lowest feature score of all of the spatial features presently included in the LADF 134. After incorporating the candidate spatial feature into the LADF 134, the method 800 returns to block 802 for the selection and evaluation of the next candidate spatial feature.

FIG. 9 illustrates an example method 900 for evaluating a spatial feature for removal from an LADF 134 in accordance with at least one embodiment. As described above, mobile devices 104 may provide LADF feedback 238 that confirms whether spatial features of the LADF 134 were observed by the mobile device 104, and the spatial feature filter module 216 may adjust the feature scores of the spatial features accordingly. Thus, the feature score for each of these spatial features serves as an indicator of the current reliability of the spatial feature for localization purposes. Accordingly, in response to a trigger condition, at block 902 the spatial feature filter module 216 selects a spatial feature currently included in the LADF 134 and at block 904 the spatial feature filter module 216 compares the feature score of the selected spatial feature with a specified threshold, designated "THRESH_L". This threshold may be a fixed threshold, or may be based on one or more current conditions. For example, in one embodiment, the threshold THRESH_L may be set to the median current feature score for the candidate spatial features not presently included in the LADF 134.

In the event that the feature score of the candidate spatial feature does exceed the threshold THRESH_L, the spatial feature filter module 216 ceases any further consideration of the selected spatial feature (in the current round of evaluation), and the method 900 returns to block 902 for the selection of the next spatial feature in the LADF 134. Otherwise, if the feature score falls below the threshold THRESH_L, at block 906 the spatial feature filter module 216 signals the localization generation module 218 to remove the selected spatial feature from the LADF 134. In some embodiments, the removal of a spatial feature from the LADF 134 may require the selection of another spatial feature to replace the removed spatial feature and thus serve as a trigger condition to initiate the candidate spatial feature evaluation process of method 800 of FIG. 8. After removing the selected spatial feature from the LADF 134, the method 900 returns to block 902 for the selection and evaluation of the next spatial feature in the LADF 134.

Figure 10:
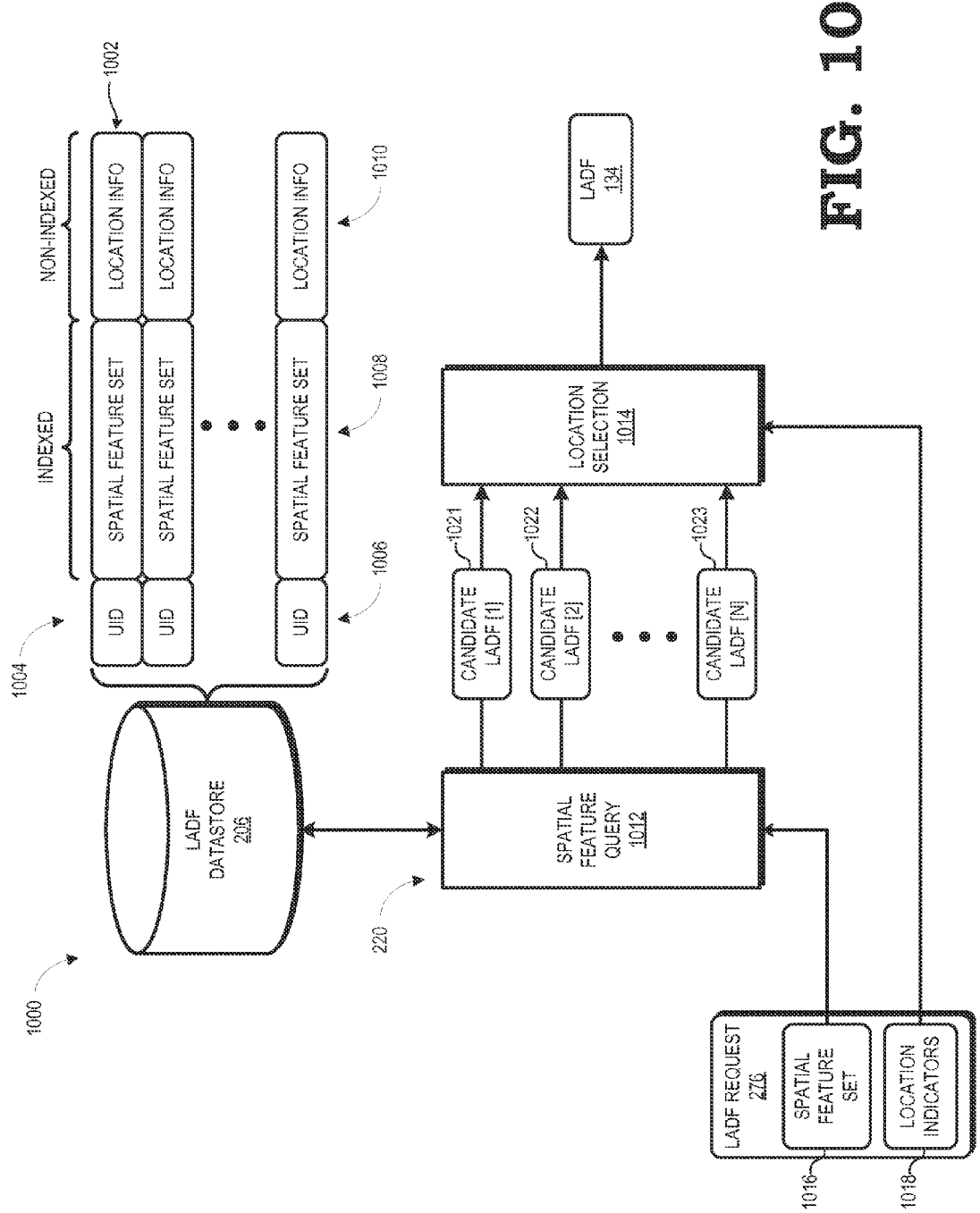
FIG. 10 is a diagram illustrating a two-level query interface for an LADF database of an area description file server for performing localization area description file queries in accordance with at least one embodiment of the present disclosure.
Figure 11:
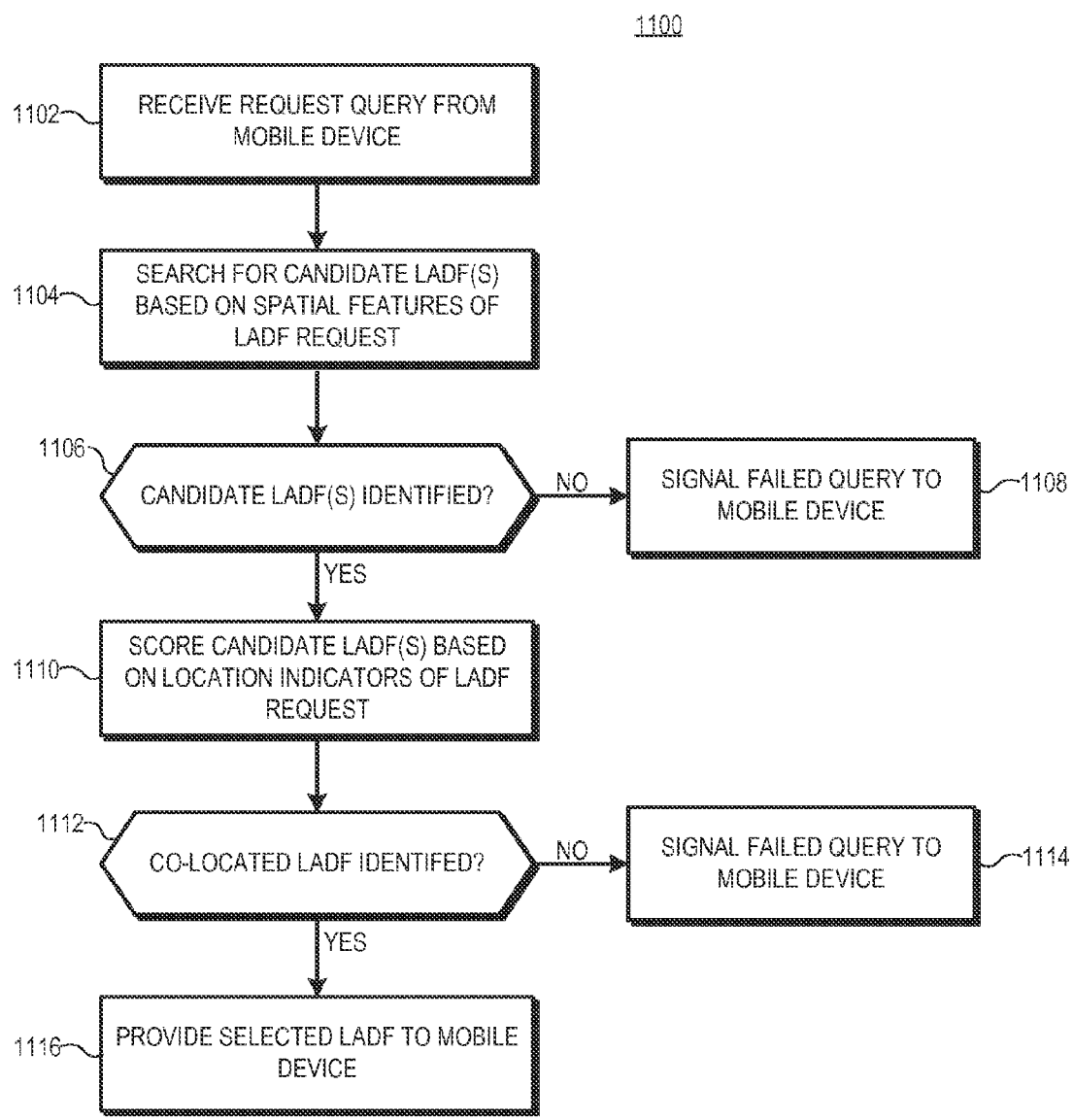
FIG. 11 is a flow diagram illustrating a method for a two-level query for a localization area description file in accordance with at least one embodiment of the present disclosure.
Figure 12:
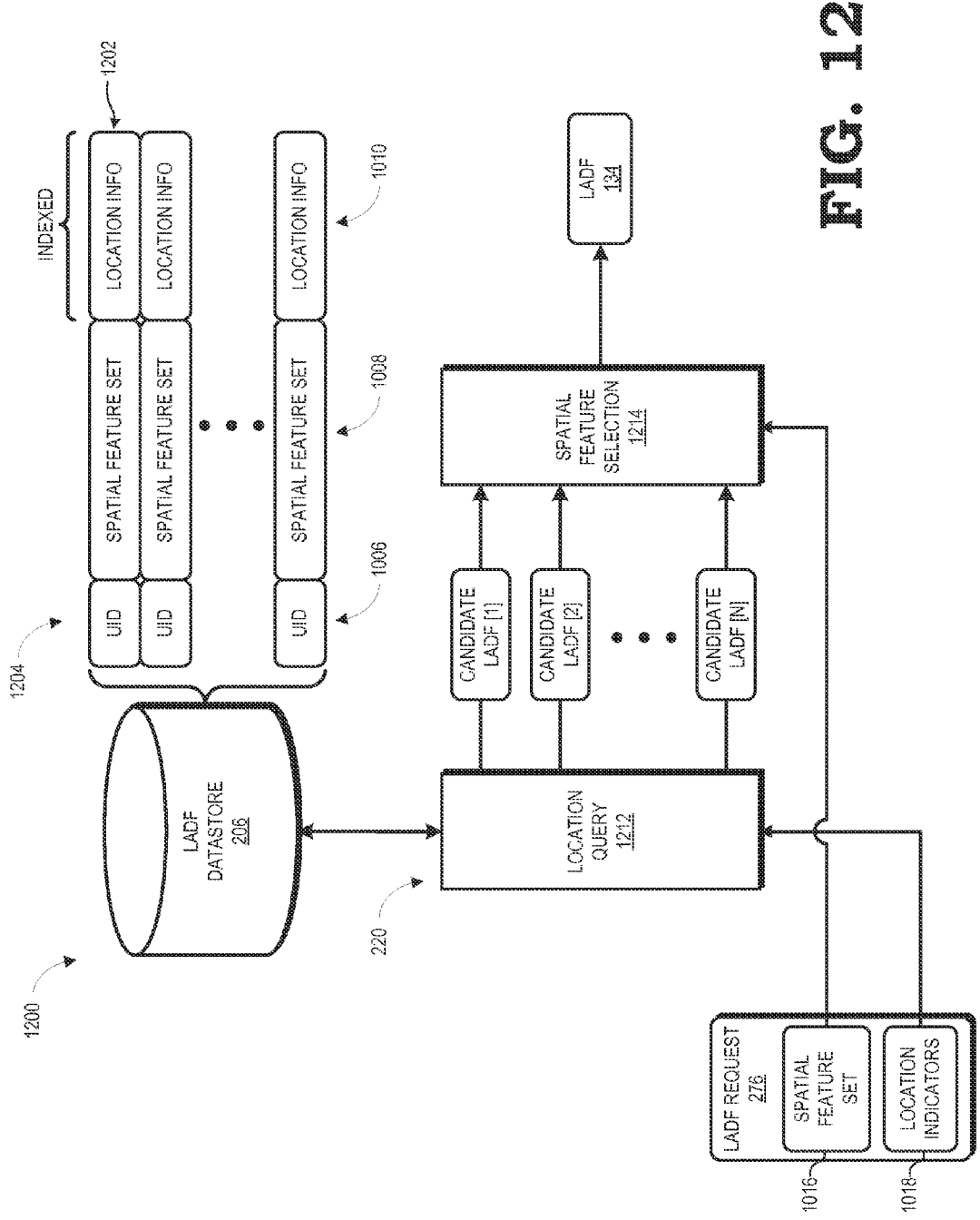
FIG. 12 is a diagram illustrating an alternative two-level query interface for an LADF database of an area description file server for performing localization area description file queries in accordance with at least one embodiment of the present disclosure.

The LADFs maintained by the ADF server 102 contain representations of visual features and geometric information of an area of the world. This information is potentially sensitive, and thus the ADF server 102 takes care to prevent unauthorized or unintended access to the LADF content stored in the LADF datastore 206 and the ADF content stored in the ADF datastore 204 (which may comprise the same datastore in some implementations). To this end, the ADF server 102 employs a privacy safeguard in the form of a two-layer indexing scheme for the LADF content of the LADF datastore 206. FIGS. 10-12 illustrate an example configuration of the query module 220 and the LADF datastore 206 and operations thereof in accordance with this two-layer indexing scheme. The ADF datastore 204 may be similarly configured in the manner described below.

FIG. 10 illustrates an example two-layer query interface 1000 implemented by the query module 220 and the LADF datastore 206. As depicted, each LADF (e.g., LADF 134) stored by the LADF datastore 206 is stored in a corresponding LADF entry 1002 of a LADF database 1004 implemented in the LADF datastore 206. Each LADF entry 1002 includes a plurality of fields, including a UID field 1006 to store a UID associated with the LADF stored therein, a spatial feature field 1008 to store the set of spatial features presently represented by the LADF, and a location field 1010 to store the location indicator or other location data associated with the LADF.

Without adequate safeguards, an unauthorized party may be able to obtain the LADF 134 from the LADF datastore 206, and thus risk exposure of potentially sensitive information. The two-layer query interface 1000 may more fully secure the LADF data of the LADF datastore 206 by requiring that the requesting mobile device 104 or other requestor prove that they are at (or have been at) the area associated with a requested LADF. Some location indicators, such as GPS coordinates, may be easily spoofed or otherwise forged. Further, other types of location indicators, such as WLAN MAC addresses or cell tower BSIDs may cover regions far larger than the area of interest, and thus may lack sufficient granularity. As such, location indicators alone may not be sufficient proof that a requesting mobile device is in fact in the specified area. Thus, the query interface 1000 may instead require proof that the mobile device 104 is in the specified area by requiring that the mobile device 104 submit a set of spatial features observed by the mobile device 104 in the specified area. The query interface 1000 then may compare this set of spatial features with the spatial features of the LADF entries to identify a matching LADF. However, many areas have similar structural configurations (e.g., similar rooms within an office building), and thus there is a risk that multiple LADFs may adequately match the submitted set of spatial features, and thus the incorrect LADF may be supplied to the requesting mobile device, which is doubly problematic as it both represents a potential privacy breach as well as provides the mobile device 104 with the incorrect reference for localization.

Thus, to ensure both that the mobile device is in fact in the area it represents it is and to ensure the correct LADF is supplied to the mobile device, the query interface 1000 utilizes both a set of spatial features and one or more location indicators submitted by a mobile device to identify the correct LADF from the LADF database 1004. It should be appreciated that under this approach, the mobile device or other requestor proves that the requestor is in the identified area by submitting spatial features observed in the identified area, and thus the release of the LADF for the identified area has a low risk of unintended disclosure of potentially sensitive information as the requestor simply may look around the indicated area to obtain visual information many orders of magnitude more detailed than the visual information represented by the supplied LADF.

To this end, the query module 220 includes a spatial feature query interface 1012 and a location selection module 1014. The spatial feature query interface 1012 performs the initial query of candidate LADFs based on a search of the spatial feature fields 1008 of the LADF entries 1002 of the LADF database 1004 using a spatial feature set 1016 in a LADF request 236 submitted by a mobile device 104. This search takes into account the relative geometry of the spatial features as they are projected into the image represented by LADF request 236 to check for consistency against those in the LADF database 1004. The location selection module 1014 then selects from the identified candidate LADFs based on comparisons of the one or more location indicator 1018 submitted with the LADF request 236 with the location information for each LADF in the location fields 1010 of the candidate LADFs.

Further, to prevent search or other access of the LADF entries 1002 using a location indicator or other key besides a set of spatial features, in some embodiments the LADF datastore 206 is configured to index the LADF entries 1002 by the spatial feature fields 1008 and further is configured to avoid indexing of the LADF entries 1002 by the location fields 1010. In this configuration, the LADF entries 1002 of the LADF database 1004 are searchable via the spatial feature sets of the LADFs but cannot be initially searched by location. In this manner, submission of a location indicator alone will not result in the identification or production of any LADFs 134 from the LADF database 1004.

FIG. 11 illustrates an example method 1100 of operation of the two-layer query interface 1000 of FIG. 10 in accordance with at least one embodiment of the present disclosure. The method 1100 initiates at block 1102 with the submission of an LADF request 236 for an indicated area from a mobile device or other requestor. In at least one embodiment, in order to accept a LADF request 236 for processing, the ADF server 102 requires that the LADF request 236 include at least the spatial feature set 1016 observed in the indicated area and one or more location indicators 1018 obtained or determined by the mobile device in the indicated area.

At block 1104 the spatial feature query interface 1012 searches the LADF entries 1002 of the LADF database 1004 to find LADF entries 1002 that have spatial feature sets in the spatial feature fields 1008 that sufficiently overlap with the spatial feature set 1016 of the LADF request 236, and which have relative geometries that are consistent with the geometries of the projected spatial features of the spatial feature set 1016. In one embodiment, for each LADF entry 1002 analyzed the spatial feature query interface 1012 may determine a count of matching spatial features between the spatial feature set 1016 and the spatial feature field 1008 of the LADF entry 1002. The spatial feature query interface 1012 then may select N candidate LADFs (e.g., candidate LADFs 1021, 1022, 1023 of FIG. 10) based on the count values determined for the LADF entries 1002. For example, in some instances every LADF having a count greater than a specified threshold may be selected as a candidate LADF. In other instances, the spatial feature query interface 1012 may select the N LADFs with the highest count values as the N candidate LADFs.

At block 1106 the spatial feature query interface 1012 verifies that at least one candidate LADF has been identified from the LADF database 1004. If not, at block 1108 the query module 220 signals to the requesting mobile device that an LADF is unavailable for the indicated area. Otherwise, the one or more identified candidate LADFs are supplied to the location selection module 1014 (e.g., by identifying the UIDs of the candidate LADFs), and at block 1110 the location selection module 1014 compares the one or more location indicators 1018 of the LADF request 236 with the locations indicated by the location fields 1010 of the candidate LADFs to score a match between each candidate LADF and the one or more location indicators 1018. At block 1112, the location selection module 1014 verifies whether there is a sufficient match between the one or more location indicators 1018 and the location information of one of the candidate LADFs. If not, at block 1114 the query module 220 signals to the requesting mobile device that an LADF is unavailable for the indicated area. Otherwise, at block 1116 the location selection module 1014 selects the candidate LADF with the best location match score as the LADF co-located as the identified area and provides this selected LADF as the LADF 134 for the area to the mobile device in response to the LADF request 236.

In addition to providing protection against unauthorized or unintended access to the LADFs of the LADF database 1004, performing the LADF query using spatial features and their geometry as detected by the mobile device ensures that the LADF ultimately selected through the two-stage query process will allow the mobile device to successfully localize using the matching LADF. This is because the first stage of the LADF query process performs the same or similar "localization" process to identify candidate LADFs as the localization process performed at the mobile to find the pose of the mobile device relative to the LADF using the observed spatial features and their image geometry in the LADF.

FIG. 12 illustrates an alternative configuration of the two-layer query interface 1000 in accordance with at least one embodiment. As with the implementation depicted in FIG. 10, the LADF datastore 206 implements an LADF database 1204 comprising a plurality of LADF entries 1202, each LADF entry 1202 having the UID field 1006, the spatial feature field 1008, and the location field 1010. However, in contrast to the implementation of FIG. 10, the LADF database 1204 instead indexes the LADF entries 1202 based on the location field 1010. Further, in this embodiment, the query module 220 comprises a location query interface 1212 to the LADF database 1204 and a spatial feature selection module 1214.

In the depicted implementation, the two-layer query for an LADF is implemented as a first layer search of LADF entries 1202 by the location query interface 1212 for LADFs that have location information that sufficiently matches the one or more location indicators 1018 of the LADF request 236 to identify a set of one or more candidate LADFs. The spatial feature selection module 1214 then compares the spatial feature set 1016 of the LADF request 236 to select the candidate LADF that best matches the spatial feature set 1016 as the LADF 134 to be supplied to the requesting mobile device in response to the LADF request 236.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "pro-gram", as used herein, is defined as a sequence of instructions designed for execution on a computer system. A "program", or "computer program", may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   receiving, at a computing system, a set of one or more area description files from a set of one or more first mobile devices, each area description file representing a point cloud of spatial features detected by a corresponding first mobile device at an area;
   generating, at the computing system, a localization area description file for the area from the set of one or more area description files, the localization area description file representing a point cloud of spatial features for the area; and
   providing the localization area description file from the computing system to a second mobile device, wherein:
      the set of one or more area description files comprises a plurality of area description files; and
      generating the localization area description file comprises:
         identifying the plurality of area description files as being associated with the area;
         deduplicating the point clouds represented by the plurality of area description files;
         determining a relative alignment of the point clouds represented by the plurality of area description files; and
         incorporating the point clouds in the localization area description file.

2. The method of claim 1, further comprising:
   performing a localization process at the second mobile device using the localization area description file.

3. A method comprising:
receiving, at a computing system, a set of one or more area description files from a set of one or more first mobile devices, each area description file representing a point cloud of spatial features detected by a corresponding first mobile device at an area;
generating, at the computing system, a localization area description file for the area from the set of one or more area description files, the localization area description file representing a point cloud of spatial feature for the area; and
providing the localization area description file from the computing system to a second mobile device,
wherein each area description file of the set of one or more area description files comprises:
spatial feature data specifying, for each spatial feature of the point cloud represented by the area description file, a multidimensional coordinate of the spatial feature based on a corresponding coordinate frame;
statistical data representing, for each spatial feature, a visual appearance of the spatial feature independent of angle of view or lighting conditions; and
sensor data captured from one or more non-image sensors concurrent with detection of the spatial features of the point cloud.

4. The method of claim 3, wherein generating the localization area description file comprises:
incorporating at least a subset of the spatial feature data and the statistical data of each area description file of the set in the localization area description file; and
excluding the sensor data of each area description file in the set from the localization area description file.

5. The method of claim 1, wherein generating the localization area description file further comprises:
eliminating spatial features from the point clouds based on at least one stability criterion.

6. The method of claim 1, wherein generating the localization area description file further comprises:
identifying a plurality of sub-areas based on the point clouds; and
generating a local area description file for each sub-area from the spatial features of the point clouds that are located in the sub-area.

7. The method of claim 1, further comprising:
receiving, at the computing system, feedback data from the second mobile device, the feedback data identifying whether one or more of the spatial features represented by the localization area description file was detected by the second mobile device while in the area;
updating, at the computing system, the localization area description file based on the feedback data to generate an updated localization area description file; and
providing the updated localization area description file from the computing system to a third mobile device.

8. A method comprising;
receiving, at a computing system, a set of one or more area description files from a set of one or more first mobile devices, each area description file representing a point cloud of spatial feature detected by a corresponding first mobile device at an area;
generating, at the computing system, a localization area description file for the area from the set of one or more description files, the localization area description file representing a point cloud of spatial feature for the area;
providing the localization area description file from the computing system to a second mobile device;
receiving, at the computing system, feedback data from the second mobile device, the feedback data identifying whether one or more of the spatial feature represented by the localization area description file was detected by the second mobile device while in the area;
updating, at the computing system, the localization area description file based on the feedback data to generate an update localization area description file; and
providing the update localization area description file from the computing system to a third mobile device,
wherein updating the localization area description file comprises:
maintaining a score for each spatial feature represented by the local area description file; and
for a spatial feature represented by the localization area description file:
increasing a score of the spatial feature in response to the feedback data indicating that the spatial feature was detected by the second mobile device;
decreasing the score of the spatial feature in response to the feedback data indicating that the spatial feature was not detected by the second mobile device; and
selectively removing the spatial feature from the localization area description file based on a comparison of the score to at least one threshold.

9. A method comprising;
receiving, at a computing system, a set of one or more area description files from a set of one or more first mobile devices, each area description file representing a point cloud of spatial feature detected by a corresponding first mobile device at an area;
generating, at the computing system, a localization area description file for the area from the set of one or more area description files, the localization area description file representing a point cloud of spatial feature for the area;
providing the localization area description file from the computing system to a second mobile device;
receiving, at the computing system, feedback data from the second mobile device, the feedback data identifying whether one or more of the spatial feature represented by the localization area description file was detected by the second mobile device while in the area;
updating, at the computing system, the localization area description file based on the feedback data to generate an update localization area description file; and
providing the update localization area description file from the computing system to a third mobile device,
wherein:
the feedback data identifies a spatial feature detected by the second mobile device and which was not represented by the localization area description file; and
wherein updating the localization area description file comprises:
increasing a score associated with the spatial feature detected by the second mobile device; and
selectively modifying the localization area description file to include the spatial feature detected by the second mobile device responsive to a comparison of the score and at least one threshold.

10. A computing system comprising;
a network interface to couple to a plurality of mobile devices;
a first datastore;
a second datastore;
a merge module couple to the network interface and the datastore, the merge module to receive a set of one or more area description files from a set of one or more first mobile devices, each area description file representing a point cloud of spatial feature detected by a corresponding first mobile device at an area;

a localization generation module coupled to the first datastore and the second datastore, the localization generation module to generate a localization area description file for the area from the set of one or more area description files and to store the localization area description file in the second datastore, the localization area description file representing a point cloud of spatial features for the area; and a query module coupled to the second datastore and the network interface, the query module to provide the localization area description file to at least one second mobile device via the network interface, wherein:

each area description file of the set comprises:
spatial feature data specifying, for each spatial feature of the point cloud represented by the area description file, a multidimensional coordinate of the spatial feature based on a corresponding coordinate frame; and statistical data representing, for each spatial feature, a visual appearance of the spatial feature independent of angle of view or lighting conditions; and sensor data captured from one or more non-image sensors concurrent with detection of the spatial features of the point cloud; and the localization area description file comprises:
at least a subset of the spatial feature data of each area description file of the set; and
at least a subset of the statistical data of each area description file of the set.

11. The computing system of claim 10, wherein:
the set of one or more area description files comprises a plurality of area description files;
the query module is to identify the plurality of area description files as being associated with the area; and
the merge module is to generate the localization area description file by:
deduplicating the point clouds represented by the plurality of area description files;
determining a relative alignment of the point clouds; and
incorporating the point clouds in the localization area description file.

12. The computing system of claim 11, wherein:
the merge module further is to generate the localization area description file by eliminating spatial features from the point clouds based on at least one stability criterion.

13. The computing system of claim 11, wherein:
the merge module further is to generate the localization area description file further by:
identifying a plurality of sub-areas based on the point clouds; and
generating a local area description file for each sub-area from the spatial features of the point clouds that are located in the sub-area.

14. The computing system of claim 10, further comprising:
a spatial feature filter module coupled to the first datastore and the network interface, the spatial feature filter module to receive feedback data from the second mobile device, the feedback data identifying whether one or more of the spatial features represented by the localization area description file was detected by the second mobile device using the localization area description file, and to update the localization area description file based on the feedback data to generate an updated localization area description file; and wherein the query module is to provide the updated localization area description file to at least one third mobile device via the network interface.

15. The computing system of claim 14, wherein:
the spatial feature filter module is to update the localization area description file by:
maintaining a score for each spatial feature represented by the local area description file; and
for a spatial feature represented by the localization area description file:
increasing a score of the spatial feature in response to the feedback data indicating that the spatial feature was detected by the second mobile device;
decreasing the score of the spatial feature in response to the feedback data indicating that the spatial feature was not detected by the second mobile device; and
selectively removing the spatial feature from the localization area description file based on a comparison of the score to at least one threshold.

16. The computing system of claim 15, wherein:
the feedback data identifies a spatial feature detected by the second mobile device and which was not represented by the localization area description file; and
the spatial feature filter module is to update the localization area description file by:
increasing a score associated with the spatial feature detected by the second mobile device; and
selectively modifying the localization area description file to include the spatial feature detected by the second mobile device responsive to a comparison of the score and at least one threshold.

17. A mobile device comprising:
a network interface to couple to a remote computing system;
a plurality of imaging sensors to capture imagery at an area in which the mobile device is located;
a spatial feature detection module to detect a first set of spatial features in the captured imagery; and
a localization module to obtain a localization area description file for the area from the remote computing system via the network interface, the localization area description file representing a second set of spatial features for the area, and to localize the mobile device to a coordinate frame associated with the area based on a comparison of the first set of spatial features to the second set of spatial features, wherein the localization area description file comprises statistical data representing, for each of the second set of spatial feature, a visual appearance of the spatial feature independent of angle of view or lighting conditions.

18. The mobile device of claim 17, wherein:
the localization module further is to provide feedback data to the remote computing system via the network interface, the feedback data identifying at least one of:
whether a spatial feature of the second set was detected in the first set; and
whether a spatial feature in the first set was not detected in the second set.

19. A mobile device comprising:
a network interface to couple to a remote computing system;

a plurality of imaging sensors to capture imagery at an area at which the mobile device is located;

a spatial feature detection module coupled to the plurality of imaging sensors, the spatial feature detection module to detect a set of spatial features in the captured imagery;

a set of one or more one non-image sensors to capture sensor data concurrent with the capture of the imagery; and an assembly module coupled to the network interface, the spatial feature detection module, and the set of one or more non-image sensors, the assembly module to provide an area description file to the remote computing system via the network interface, the area description file representing a point cloud of a selected subset of the set of spatial features and including the sensor data, wherein the area description file comprises:

spatial feature data specifying, for each spatial feature of the point cloud represented by the area description file, a multidimensional coordinate of the spatial feature based on a corresponding coordinate frame;

statistical data representing, for each spatial feature, a visual appearance of the spatial feature independent of angle of view or lighting conditions; and sensor data captured from one or more non-image sensors.

20. The mobile device of claim 19, wherein:

the assembly module further is to identify an area at which the mobile device is located and to request a localization area description file for the identified area from the remote computing system; and the assembly module is to provide the area description file responsive to an indication from the remote computing system that the requested localization area description file is unavailable for the identified area.

* * * * *

UNITED STATES PATENT AND TRADEMARK OFFICE
CERTIFICATE OF CORRECTION

PATENT NO. : 9,811,734 B2
APPLICATION NO. : 14/708877
DATED : November 7, 2017
INVENTOR(S) : Brian Patrick Williams et al.

It is certified that error appears in the above-identified patent and that said Letters Patent is hereby corrected as shown below:

In the Claims

At Column 23, Line 10, please correct "spatial feature for" to be --spatial features for--

At Column 23, Line 59, please correct "spatial feature detected" to be --spatial features detected--

At Column 23, Line 64, please correct "spatial feature for" to be --spatial features for--

At Column 24, Line 3, please correct "spatial feature represented" to be --spatial features represented--

At Column 24, Line 8, please correct "an update localization" to be --an updated localization--

At Column 24, Line 9, please correct "the update localization" to be --the updated localization--

At Column 24, Line 30, please correct "spatial feature detected" to be --spatial features detected--

At Column 24, Line 35, please correct "spatial feature for" to be --spatial features for--

At Column 24, Line 41, please correct "spatial feature represented" to be --spatial features represented--

At Column 24, Line 66, please correct "module couple to" to --module coupled to--

At Column 25, Line 3, please correct "spatial feature detected" to be --spatial features detected--

At Column 26, Line 53, please correct "spatial feature, a" to be --spatial features, a--

Signed and Sealed this
Second Day of July, 2019

Andrei Iancu
*Director of the United States Patent and Trademark Office*